(12) United States Patent
Chase et al.

(10) Patent No.: US 12,375,036 B2
(45) Date of Patent: Jul. 29, 2025

(54) MACHINES AND METHODS FOR MONITORING PHOTOVOLTAIC SYSTEMS

(71) Applicant: ONSIGHT TECHNOLOGY, INC., Folsom, CA (US)

(72) Inventors: Derek Chase, Folsom, CA (US); John Shepard, Folsom, CA (US); Graham Ryland, Folsom, CA (US)

(73) Assignee: ONSIGHT TECHNOLOGY, INC.

( * ) Notice: Subject to any disclaimer, the term of this patent is extended or adjusted under 35 U.S.C. 154(b) by 0 days.

(21) Appl. No.: 18/391,553

(22) Filed: Dec. 20, 2023

(65) Prior Publication Data

US 2024/0195354 A1 Jun. 13, 2024

Related U.S. Application Data

(63) Continuation of application No. 18/490,705, filed on Oct. 19, 2023, now Pat. No. 12,095,418, and a
(Continued)

(51) Int. Cl.
*H02S 50/00* (2014.01)
*B25J 19/02* (2006.01)
(Continued)

(52) U.S. Cl.
CPC .............. *H02S 50/00* (2013.01); *B25J 19/02* (2013.01); *B64U 20/87* (2023.01); *G08B 21/182* (2013.01);
(Continued)

(58) Field of Classification Search
CPC ....... H02S 50/00; H02S 20/23; G08B 21/182; H04N 23/90
(Continued)

(56) References Cited

U.S. PATENT DOCUMENTS 9,680,412 B2 6/2017 Stoicescu et al.
11,510,361 B2 11/2022 Matus
(Continued)

FOREIGN PATENT DOCUMENTS

AU 2018101283 10/2018
CN 211905127 11/2020
(Continued)

OTHER PUBLICATIONS

International Searh Report issued in International Application No. PCT/US2023/022134, mailed Sep. 25, 2023.
(Continued)

*Primary Examiner* — Michael J Brown
(74) *Attorney, Agent, or Firm* — Ferguson Case Orr Paterson

(57) ABSTRACT

The present application describes machines and methods that leverage enabling technologies such as robotics, sensing, machine learning, and wireless internet coverage (e.g., 5G cell coverage) in order to monitor photovoltaic systems such as solar sites. Machines according to the present disclosure can be operated remotely by users to traverse a solar site and perform a series of inspection steps, such as via an online portal. Autonomous and semi-autonomous operations are also possible. These methods and machines can eliminate the need for a technician to visit the site in person for routine inspection, and can provide better information when a site alarm is triggered so that if a technician does need to visit the site, he or she is better prepared. Also described herein are systems and methods for inventorying solar sites, and systems and methods for inspection of structure-mounted photovoltaic systems.

29 Claims, 16 Drawing Sheets

Related U.S. Application Data continuation of application No. PCT/US2023/022134, filed on May 12, 2023.

(60) Provisional application No. 63/438,863, filed on Jan. 13, 2023, provisional application No. 63/408,001, filed on Sep. 19, 2022, provisional application No. 63/342,587, filed on May 16, 2022.

(51) Int. Cl.

| | | |
|---|---|---|
| *B64U 20/87* | (2023.01) | |
| *G08B 21/18* | (2006.01) | |
| *H02S 20/23* | (2014.01) | |
| *H02S 50/15* | (2014.01) | |
| *H04N 23/90* | (2023.01) | |
| *B64U 101/26* | (2023.01) | |

(52) U.S. Cl.
CPC .............. *H02S 20/23* (2014.12); *H02S 50/15* (2014.12); *H04N 23/90* (2023.01); *B64U 2101/26* (2023.01)

(58) Field of Classification Search
USPC .................................. 136/244; 700/299, 244
See application file for complete search history.

(56) References Cited

U.S. PATENT DOCUMENTS

| | | | |
|---|---|---|---|
| 2012/0152877 A1 | 6/2012 | Tadayon | |
| 2014/0267391 A1* | 9/2014 | Cummings | G06T 11/206 |
| | | | 345/629 |
| 2016/0105145 A1 | 4/2016 | Drake | |
| 2017/0019570 A1* | 1/2017 | Meller | H04N 23/60 |
| 2017/0116460 A1 | 4/2017 | Jungerman | |
| 2018/0358924 A1 | 12/2018 | Kotowski | |
| 2021/0084812 A1 | 3/2021 | Matus | |
| 2022/0077820 A1* | 3/2022 | Jeong | H02S 50/00 |
| 2023/0005115 A1 | 1/2023 | Bedrich | |

FOREIGN PATENT DOCUMENTS

| | | |
|---|---|---|
| DE | 102012208364 | 12/2014 |
| EP | 2284520 | 2/2011 |
| JP | 2019022251 | 2/2019 |
| JP | 6999911 | 1/2022 |
| KR | 1020220092389 | 7/2022 |

OTHER PUBLICATIONS

International Written Opinion issued in International Application No. PCT/US2023/022134, mailed Sep. 25, 2023.
Office Action Issued in U.S. Appl. No. 18/490,705 mailed Jan. 3, 2024.
Office Action (Notice of Allowance and Fees Due (PTOL-85)) dated Jul. 2, 2024 for U.S. Appl. No. 18/490,705 (pp. 1-8).

* cited by examiner

MACHINES AND METHODS FOR MONITORING PHOTOVOLTAIC SYSTEMS

RELATED APPLICATIONS

This application is a continuation of PCT App. No. PCT/US2023/022134 to Chase et al., filed on May 12, 2023, and entitled "Machines and Methods for Monitoring Photovoltaic Systems," which claims the priority benefit of U.S. Provisional Pat. App. No. 63/342,587 to Chase et al., filed on May 16, 2022 and entitled "Machines and Methods for Monitoring Photovoltaic Systems"; U.S. Provisional Pat. App. No. 63/408,001 to Chase et al., filed on Sep. 19, 2022 and entitled "Machines and Methods for Monitoring Photovoltaic Systems"; and U.S. Provisional Pat. App. No. 63/438,863 to Chase et al., filed on Jan. 13, 2023 and entitled "Machines and Methods for Monitoring Photovoltaic Systems." This application is also a continuation of U.S. patent application Ser. No. 18/490,705 (which is a continuation of PCT App. No. PCT/US2023/022134 and claims the priority benefit of U.S. Provisional Pat. App. Nos. 63/342,587, 63/408,001, and 63/438,863), and also claims the benefit of U.S. Provisional Pat. App. No. 63/438,863. Each of these five priority applications is fully incorporated by reference herein in its entirety.

BACKGROUND OF THE DISCLOSURE

Field

This application is directed generally toward machines (e.g., robots, which can be defined as a machine that moves based on and/or responds intelligently to sensor input) and methods for monitoring photovoltaic systems such as sites of solar modules.

Description of the Related Art

FIG. 1 shows a typical solar farm or "site" 100. There are numerous module configurations and mounting strategies. In general, a site is made up of "blocks" 102, blocks 102 are made up of "rows" 104, rows 104 are made up of "arrays" 106, arrays 106 are made up of "modules" 108 (often referred to colloquially as "panels"), and modules 108 are made up of "cells." It is understood that as used herein, a "site" could be a single-block site or a multi-block site, a block could be a single-row block or a multi-row block, a block could be a single-row block or a multi-row block, a row could be a single-array row or a multi-array row, and an array could be a single-module array or a multi-module array. One or more conduits often run above ground between rows, creating a "chase" 110. A "path" 112 separates blocks and is typically wide enough for an automobile to drive. A "lane" 114 is defined by the space between rows, is open to the path, and often dead-ends at the chase, but can also run completely across the block open to the path on the other side. A "block" is a group of rows that has paths on all sides. Rows can "tilt" to an angle measured from the ground in order to track the sun. While this is a typical solar site arrangement, other arrangements exist, such as non-linear arrangements and arrangements without dead-end rows.

Grid-scale solar expansion combined with increasing labor costs are driving solar site managers to find new ways to expand inspection capabilities while reducing cost. Many solar utility sites are operated with no personnel on site because the sites are in remote locations and often in extremely hot seasonal conditions since that is where land is cheap and the sun is best for solar harvesting. Most site contracts contain service-level guarantees requiring responsiveness and insight into system performance, and the demand for these insights and alarms is increasing each year. The labor market in utility-scale solar services is strained and labor cost growth is rapidly exceeding the rest of the market and historical pricing escalators. Utility site owners are global and the renewable operations and maintenance ("O&M") market is still fragmented and often highly localized. Technicians and staff are overwhelmed with contract performance demands and providing a responsive site presence. Current examples of monitoring systems and methods include stationary monitoring systems or aerial drones, but the capabilities and/or efficiency of such systems is often less than adequate. By way of example, aerial systems such as drones are only able to inspect the frontside of a solar module, and not the backside where many critical components are located, and require a pilot present on site during operation, leading to additional labor pressure.

Additionally, in recent years the mounting of solar panels on the tops of structures (e.g., building roofs) has become popular, including installation of panels on structures ranging from, by way of example, 100 kW to 5 MW. Inspection of such solar panels is both difficult and expensive, and malfunction of such panels often poses a fire hazard to the underlying structure. As such, a practical and efficient inspection and/or monitoring solution for structure-mounted panels is needed.

SUMMARY OF THE DISCLOSURE

One embodiment of a machine for inspection of a photovoltaic system according to the present disclosure includes a body and one or more cameras attached to the body for inspecting the photovoltaic system.

One embodiment of a method for inspecting one or more solar modules according to the present disclosure includes inspecting solar cells of a module visually and/or thermally from the frontside, and/or inspecting the solar cells visually and/or thermally from the backside.

One embodiment of a method for inspecting solar devices at a solar site according to the present disclosure includes inspecting a plurality of solar devices visually and/or thermally, and then using software, marking each of the plurality of solar devices as inspected as of its respective time of inspection. The method further includes, using the marking, determining which of the plurality of solar devices is ready for re-inspection, and re-inspecting those of the plurality of solar devices that are ready for re-inspection.

One method of determining the location of a solar device according to the present disclosure includes determining a location of a machine using a GPS system, determining an angle at which an inspection camera of the machine is inspecting the solar device, determining a distance from the machine to the solar device, and calculating a location of the solar device using the machine location, angle of inspection, and distance.

One method of inspecting a plurality of solar modules according to the present disclosure includes navigating a machine through a plurality of lanes in a block, each of the lanes formed by two successive rows of the block, and inspecting the solar modules during the navigating.

One method of inspecting a plurality of solar modules according to the present disclosure includes identifying and inspecting a starting module, and then identifying and inspecting successive modules after the starting module. This can be accomplished using a machine.

One system for inspection of a structure-mounted photovoltaic system according to the present disclosure includes a camera unit attached to a mounting structure, with the camera unit configured to inspect the photovoltaic system mounted on the structure.

These and other further features and advantages of the invention would be apparent to those skilled in the art from the following detailed description, taken together with the accompanying drawings.

BRIEF DESCRIPTION OF THE DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described and shown exemplary embodiments without departing from the true scope and spirit of the inventive embodiments described herein as defined by the claims.

DETAILED DESCRIPTION OF THE DISCLOSURE

Figure 1:
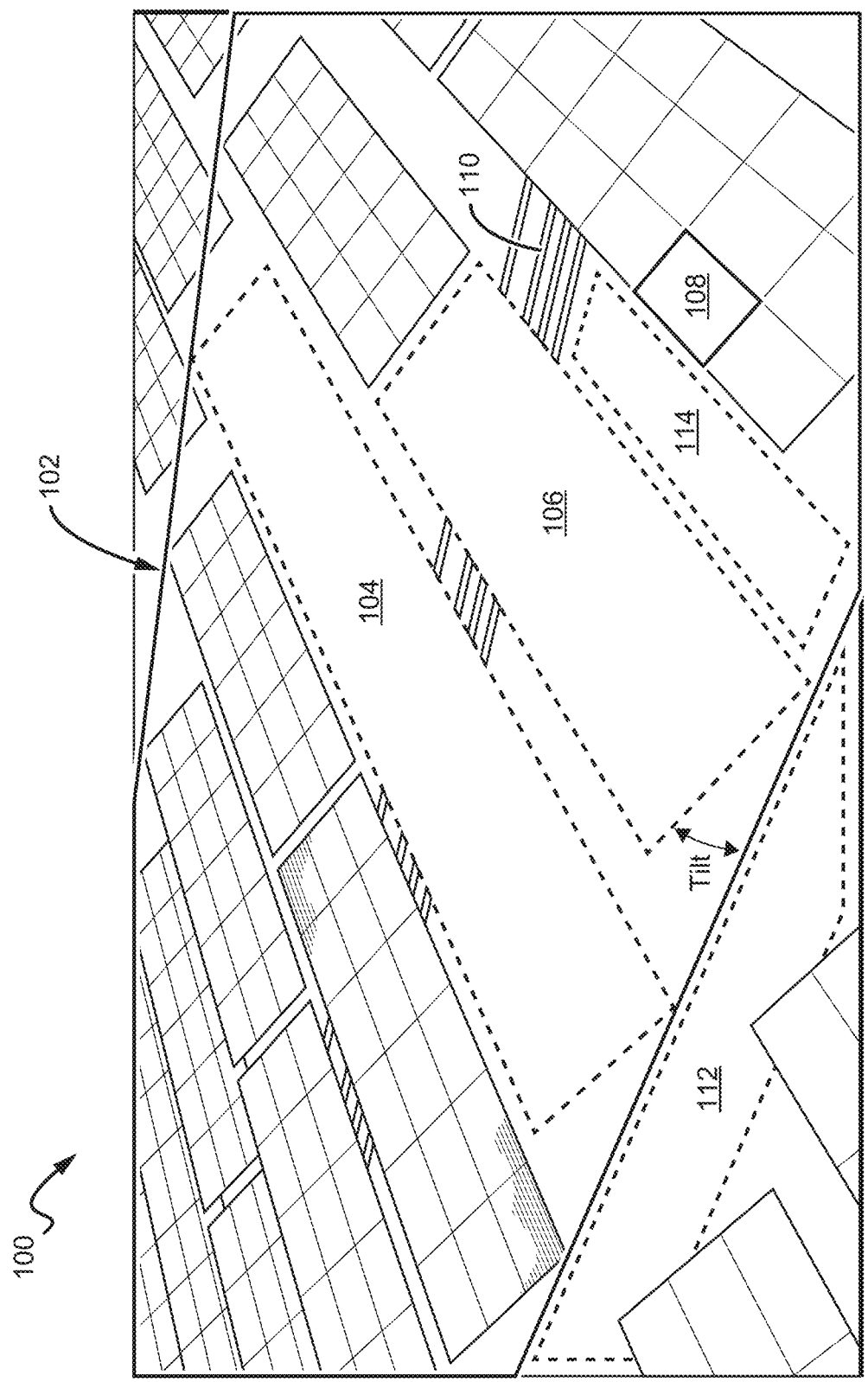
FIG. 1 is an image of a prior art solar site.

The present application describes machines and methods that leverage enabling technologies such as robotics, sensing, machine learning, and wireless internet coverage (e.g., 5G cell coverage) in order to monitor photovoltaic systems such as solar sites. Machines according to the present disclosure can be operated remotely by users to traverse a solar site and perform a series of inspection steps, such as via an online portal. Autonomous and semi-autonomous operations are also possible. The methods and machines described herein are well-suited for grid-scale solar sites with a large number of solar modules (e.g., hundreds of thousands of modules), though it is understood that the methods and machines can be used with systems of any size. These methods and machines can eliminate the need for a technician to visit the site in person for routine inspection, and can provide better information when a site alarm is triggered so that if a technician does need to visit the site, he or she is better prepared. Additionally, a machine/robot is capable of transporting a heavier sensor payload than a human inspector, allowing for higher quality thermal and color cameras than are available as a hand-held option. Also described herein are photovoltaic systems for inspection of structure-mounted systems.

Throughout this description, the preferred embodiment and examples illustrated should be considered as exemplars, rather than as limitations on the present invention. As used herein, the term "invention," "device," "method," "disclosure," "present invention," "present device," "present method," or "present disclosure" refers to any one of the embodiments of the invention described herein, and any equivalents. Furthermore, reference to various feature (s) of the "invention," "device," "method," "disclosure," "present invention," "present device," "present method," or "present disclosure" throughout this document does not mean that all claimed embodiments or methods must include the referenced feature (s).

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure. As used herein, the term "and/or" includes any and all combinations of one or more of the associated list items.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "having," and similar terms, when used herein, specify the presence of stated features, integers, steps, operations, elements, and/or components, but do not preclude the presence or addition of one or more other features, integers, steps, operations, elements, components, and/or groups thereof. The word "machine" should be interpreted to include "robot," and whenever the word "robot" is used it should be understood that the word "machine" could be substituted for that usage (i.e., a different type of machine is possible, such as a vehicle, ATV, lawn mower, car, truck, motorcycle, etc.). Machines according to the present disclosure can be self-propelled (e.g., a robot or driverless vehicle) or user-propelled (e.g., a vehicle with driver).

Embodiments of the disclosure are described herein with reference to different views and illustrations that are schematic illustrations of idealized embodiments of the disclosure. As such, variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing.

Example Machine Componentry

Figure 2B:
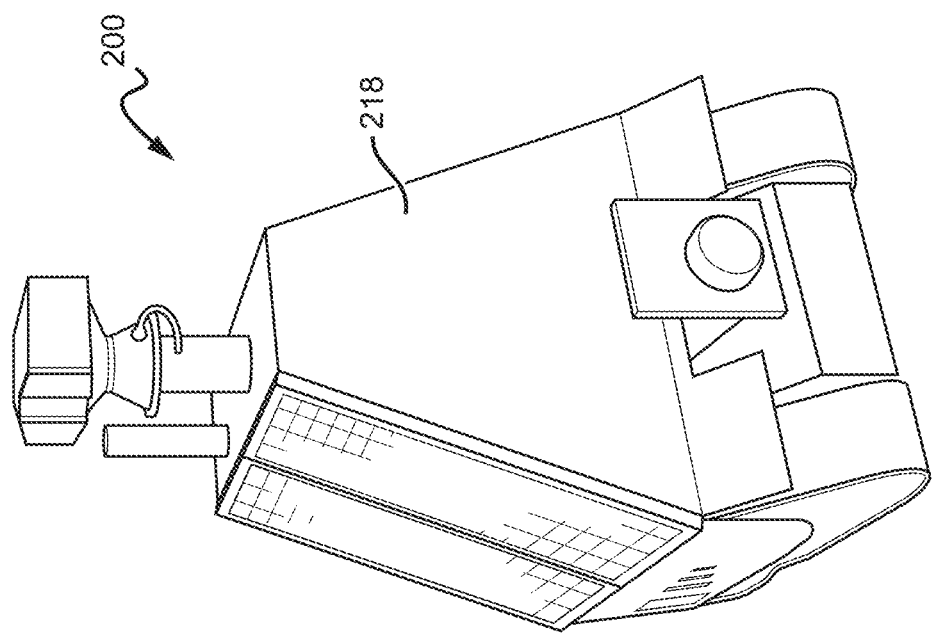
FIGS. 2A and 2B show a first embodiment of a machine according to the present disclosure.
Figure 2A:
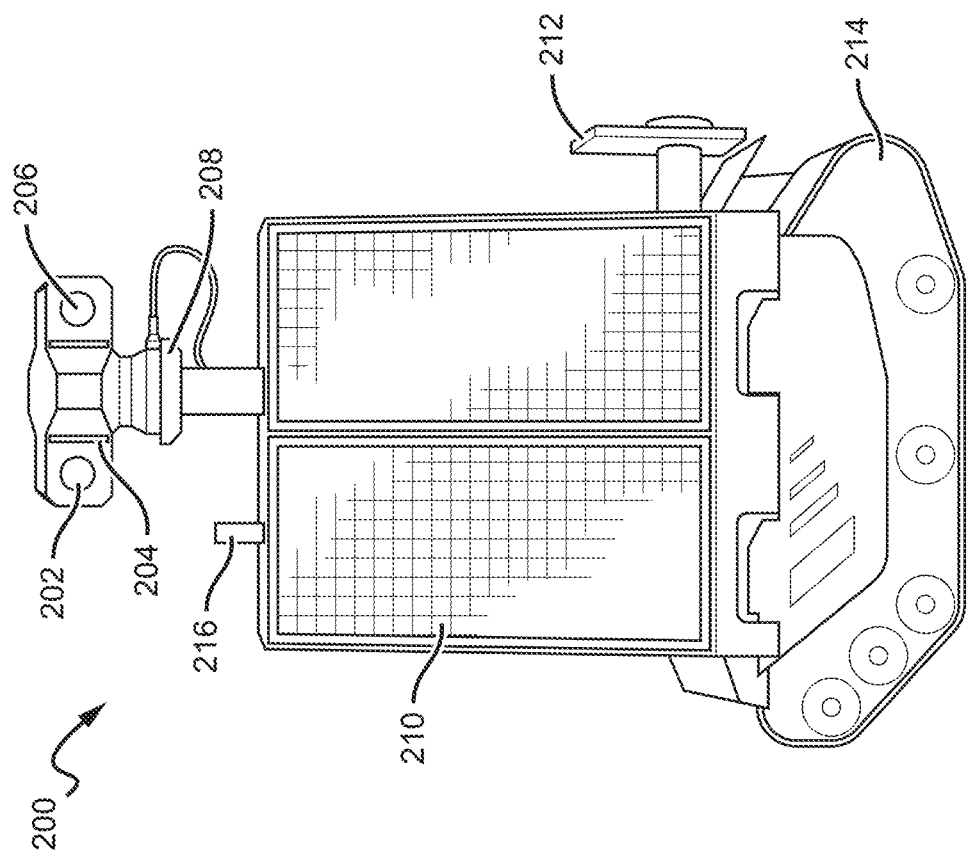

One embodiment of a machine 200 (e.g., a robot as shown) according to the present disclosure is shown in FIGS. 2A and 2B. The machine 200 can be designed to examine and/or monitor photovoltaic systems, and in some embodiments can also be designed to monitor the surroundings of such systems which may affect performance and security. The machine 200 and other machines according to the present disclosure can comprise:

- 202: an inspection camera (or cameras), which can have a zoom, pan, and/or tilt capability and/or be a color camera, such as a 4 k or 1080p color zoom camera (e.g., with 50-500× zoom, such as 100× zoom or 33× zoom, though it is understood that other embodiments are possible);
- 204: a cleaning mechanism such as a wiper for the camera 202 (note that wipers can be included for other cameras as well);
- 206: a thermal camera (or cameras), such as a radiometric thermal imager, which can have zoom, pan, and/or tilt capability, and which can be part of a singular camera module with the camera 202 as shown, or can be separate;
- 208: a rotatable head, which can provide for 360 degree viewing capability and/or can rotate 360 degrees;
- 210: one or more solar devices for supplementing operational power from a battery (though it is understood that some embodiments may be, e.g., only battery-operated, or only solar-operated);
- 212: a charger/docking unit, which can also include remote charging capability such as through inductive charging, and/or can include a mechanical/electrical connection;
- 214: tracks/treads for handling rough terrain (e.g., at least 20 degree incline or decline, such as up to a 36 degree incline or decline), with exemplary ranges and speeds (whether minimum/maximum or average) of 5 km-50 km range (e.g., 15 km range) and 0.25 km/hr-2 km/hr speed or 0.5 km/hr-1.5 km/hr speed (e.g., 1 km/hr speed) (though it should be understood that these ranges are exemplary in nature, and other ranges and speeds are possible), though it is understood that other embodiments may include different components such as wheels;
- 216: a receiver and/or antenna (e.g., satellite and/or cellular antenna for receiving signals (e.g., instruction signals, 3G/4G/5G/etc. signals, WiFi signals, etc.));
- 218: a body/skeletal structure;
- a GPS system (or other geolocation system, with "GPS" used throughout the present application for simplicity), such as an RTK (real time kinematics) GPS system;
- one or more power sources, such as batteries;
- one or more navigation cameras, such as a forward facing camera and a backward facing camera, which can be fixed or movable (e.g. zoom, pan, and/or tilt capability);
- one or more autonomous navigation cameras, such as a forward facing camera and a backward facing camera, which can in some embodiments be fixed;
- microphone and/or speaker (which can be used to communicate with people in the field during teleoperation);
- sensors such as accelerometers, gyroscopes, magnetometers, inertial measurement units, etc., with one specific embodiment including a 9-axis inertial measurement unit;
- one or more distance sensors, such as LiDAR sensors; and/or
- one or more range finders, such as an AI range finder.

It should be understood that the above components are exemplary in nature, and that embodiments with additional components, multiple of any of the above components, and/or fewer than all of the above components are envisioned. Additionally, some elements can be combined into a single element, or some elements can also serve the purpose (s) of one or more other elements. As but one example, an inspection camera or cameras can also serve as a navigation camera or cameras, or vice versa. Moreover, the specific arrangement of the machine 200 and arrangement of components as shown in FIGS. 2A and 2B is exemplary in nature, and it should be understood that numerous different arrangements are possible.

Inspection

Figure 3A:
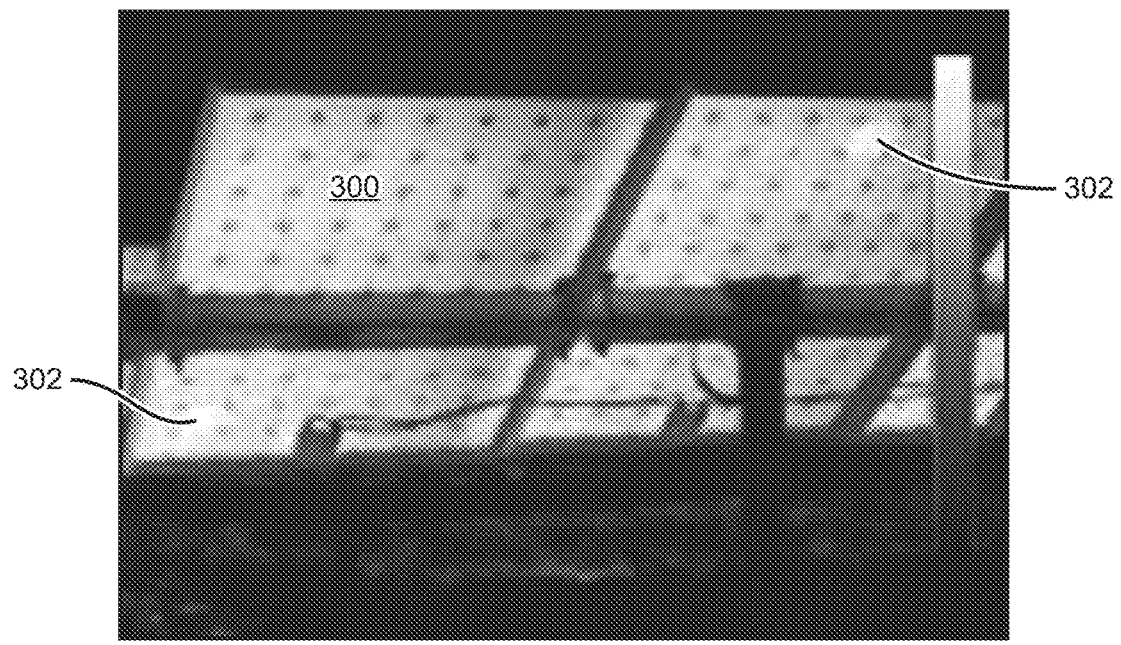
FIG. 3A is a thermal image of the backside of a solar panel taken by one embodiment of a machine according to the present disclosure.
Figure 3B:
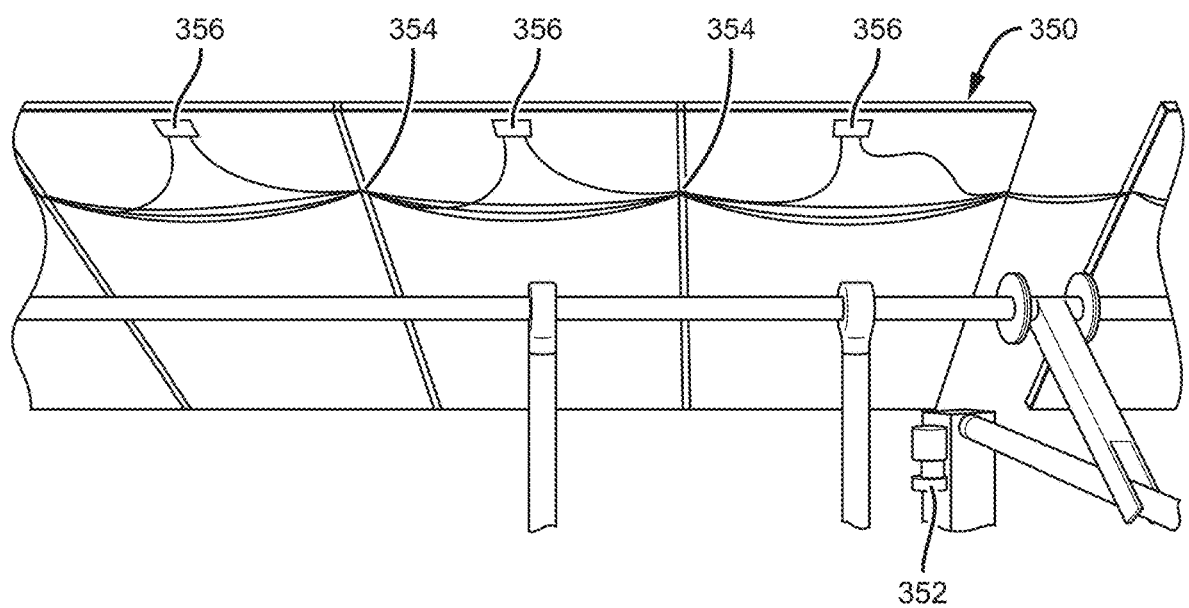
FIG. 3B is an image of the backside of a solar panel that could be taken by one embodiment of a machine according to the present disclosure.

While prior art aerial inspection methods permit inspection of the frontside of solar devices, inspection of the backside of those devices often provides more and/or better information which can be used, for instance, to diagnose a broader set of potential issues. For instance, inspection of the backside of the devices can provide information regarding solar cell performance, connector health, wire insulation health, junction box health, sun tracking motor health, module damage, and/or fire hazards. For example, FIG. 3A is an image of the backside of a solar device 300 taken by a thermal imaging camera such as the camera 206, and shows hotspots 302 (brighter yellow) that may not be visible taking a thermal image of the frontside of the device 300. Such imaging is difficult or impossible to obtain without being at or near ground level and in close proximity to the solar device 300, but is possible utilizing the machine 200. As another example, FIG. 3B is an image (e.g., a photographic image) of the backside of a solar device 350 with various connectors 354 and junction boxes 356 as well as a motor 352, all of which can be inspected using the machines and methods of the present disclosure.

Various different aspects of a site can be inspected using the machine 200 and the components thereof. Some examples include:
- site conditions such as grass height and erosion, which can be inspected using, for example, the inspection camera (s) 202, LiDAR sensor (s), and/or AI range finders;
- security elements, such as gate and fence integrity (e.g. cuts, holes, fallen areas, raised areas), which can be inspected using, for example, the inspection camera (s) 202 and/or thermal camera (s) 206;
- tracker motor health;
- cables and connectors (e.g., solar connectors such as PV4 connectors), which can be inspected using, for example, the inspection camera (s) 202 and/or thermal camera (s) 206;
- the backside/underside of solar elements such as modules and panels, for things such as wire damage (e.g. wire insulation damage), cell damage, hot spots, environmental issues such as rat nests, and other issues, which can be inspected using, for example, the inspection camera (s) 202 and/or the thermal camera (s) 206;
- the frontside of solar elements such as modules and panels (and in double-sided elements, solar also the backside/underside which are designed to produce energy in addition to the frontside), for things such as coating condition, thin-film delamination, environmental issues such as soiling (e.g., dust or bird feces), and obstructions (e.g. grass, trees, bent solar module frames, adjacent rows, etc.), which can be inspected using, for example, the inspection camera (s) 202 and/or the thermal camera (s) 206;
- issues such as diode faults, cell and multi-cell defects, and faulty junction boxes, which can be inspected using, for example, the inspection camera (s) 202 and/or the thermal camera (s) 206.

Figure 4A:
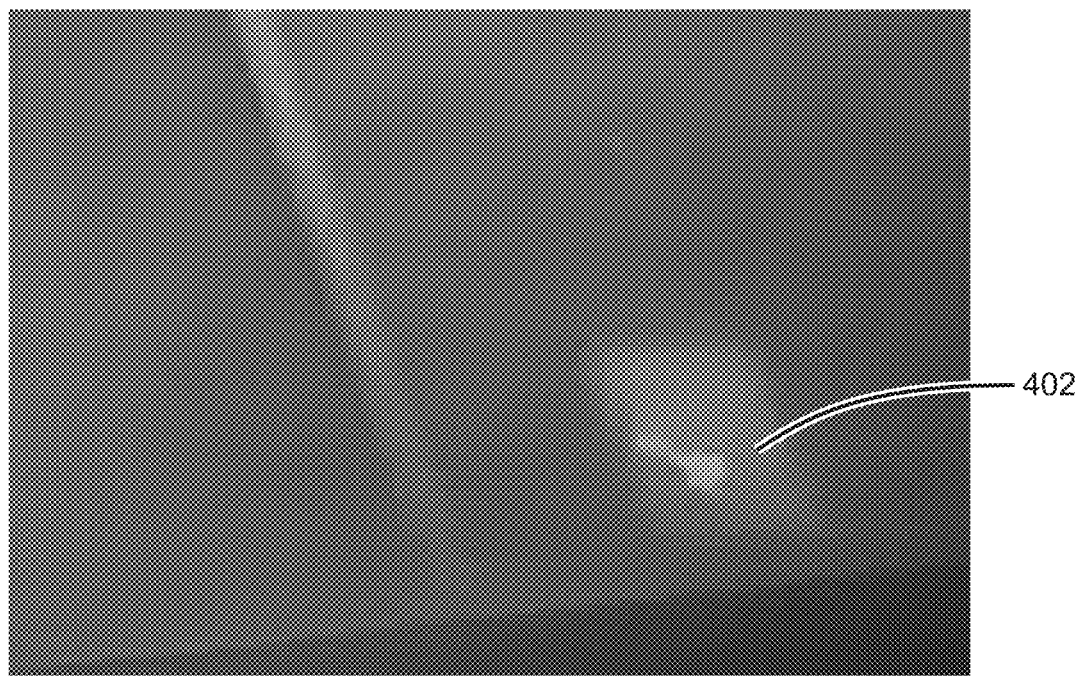
FIG. 4A is a thermal image of a solar panel taken by one embodiment of a machine according to the present disclosure.
Figure 4B:
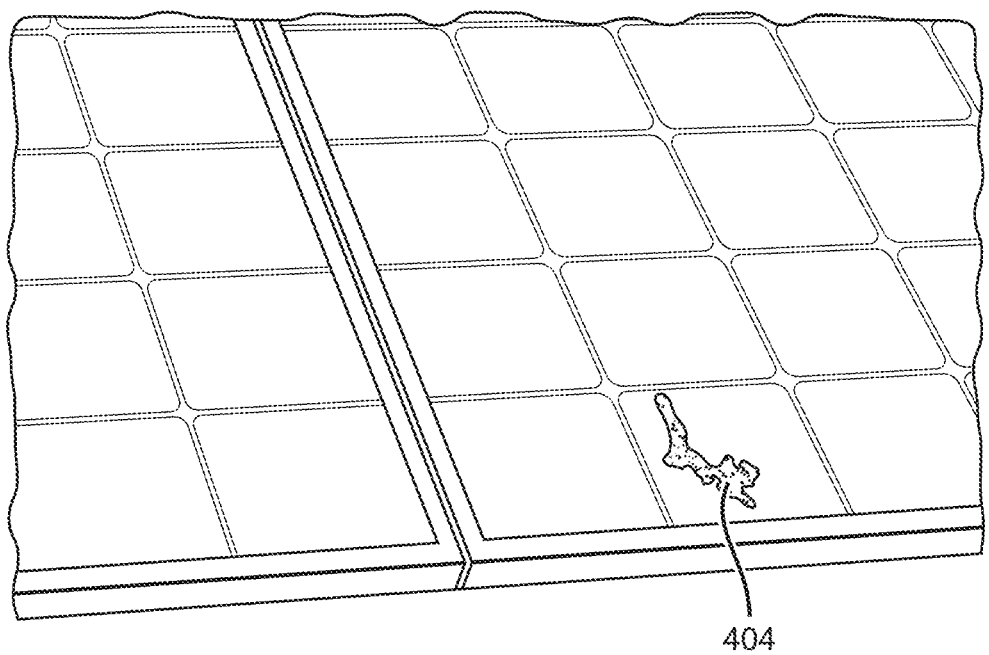
FIG. 4B is an image of a solar panel that could be taken by one embodiment of a machine according to the present disclosure.

The ability of the machine 200 to be both mobile and in close proximity to solar elements provides significant advantages. For example, FIGS. 4A and 4B show images taken from a thermal camera 202 and inspection camera 206, respectively. The combination of these two cameras can provide greater insight than either working alone. In this case, the thermal camera image in FIG. 4A shows a hot spot 402 which is an indication of a problem, while the inspection camera in FIG. 4B allows the viewer to diagnose the cause, which is bird soiling 404. In this case, a user and/or the machine 200 could return after rain to see if the problem had resolved itself without the need for costly and time-consuming human intervention.

Data Analysis

The data gathered using, for instance, the inspection camera (s) 202 and thermal camera (s) 206 can be analyzed manually and/or automatically, such as using software. For instance, machine vision can be used to sense and identify problems. Once the images are retrieved from the camera (s), they can be processed using any number of techniques (e.g. stitching/registration, filtering, pattern recognition, etc.), and an analysis output can be produced (e.g., a "pass" or "fail").

GPS Breadcrumbs

Figure 5:
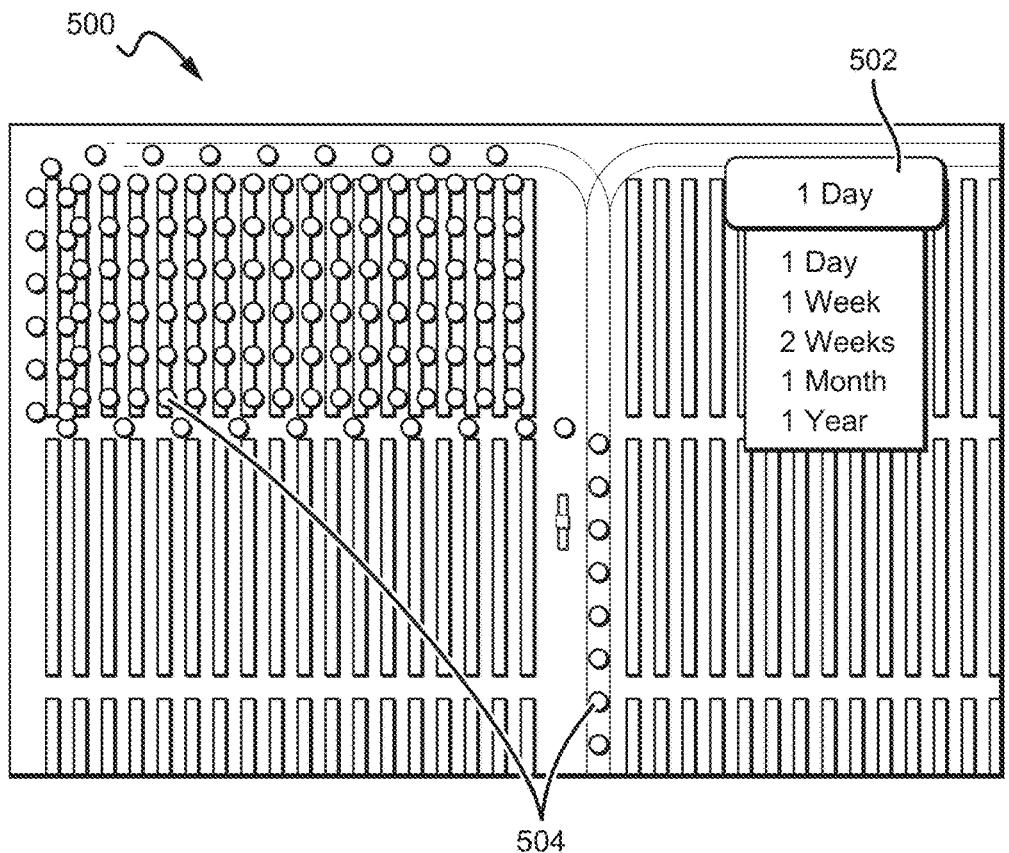
FIG. 5 is a user interface showing GPS breadcrumbs according to the present disclosure.

Grid-scale solar sites have very few landmarks to help operators differentiate between which panels have been inspected and which panels have not been inspected. The machine 200 can include a GPS system in order to track the machine's location over time, which can be logged using software, such as GPS breadcrumb software (which can track breadcrumbs, or data points including, for example, location and time). For instance, FIG. 5 shows a user interface 500 for such software tracking the location of a machine 200 over a user-selected period of time 502 by showing location indicators 504, using a satellite map view (though other views could be used). Thus, GPS breadcrumbs can be sorted by age, and older breadcrumbs can be eliminated, for instance when they are no longer applicable because the panels need to be inspected again. Many variations of this method could be used as would be understood by one of skill in the art.

Module GPS Estimation

Using its GPS system, the machine 200 can identify its own location; however, it cannot directly identify the location of the elements it is inspecting. Instead, it can utilize the angle of the camera from which the image is being taken (e.g., inspection camera 202) and/or a distance estimation (e.g., from a distance sensor and/or range finder, from triangulation using multiple images, etc.) in order to estimate the GPS location of the inspected element. This calculation can also utilize the GPS location of the machine 200 itself. The inspection element location can then be input into the GPS breadcrumb system/software or similar (e.g., other geolocation tracking software). Additionally, this location information can be associated with the image data and/or with solar element data (e.g., associated as metadata), and/or otherwise stored in a database. This can be important because the machine 200 travels in one lane to inspect the front of the modules but in a different lane to inspect the back of the same modules, but the metadata for these two inspections needs to be matched and/or co-located on a map of the solar site.

Teleoperation Example

The following is but one example of a manner in which a user can utilize the machine 200. It should be understood that many different usages and manners of operation are possible. It should also be understood that one or more of the steps described below may be omitted, steps may be combined, and other steps not described below may be included.

Figure 15A:
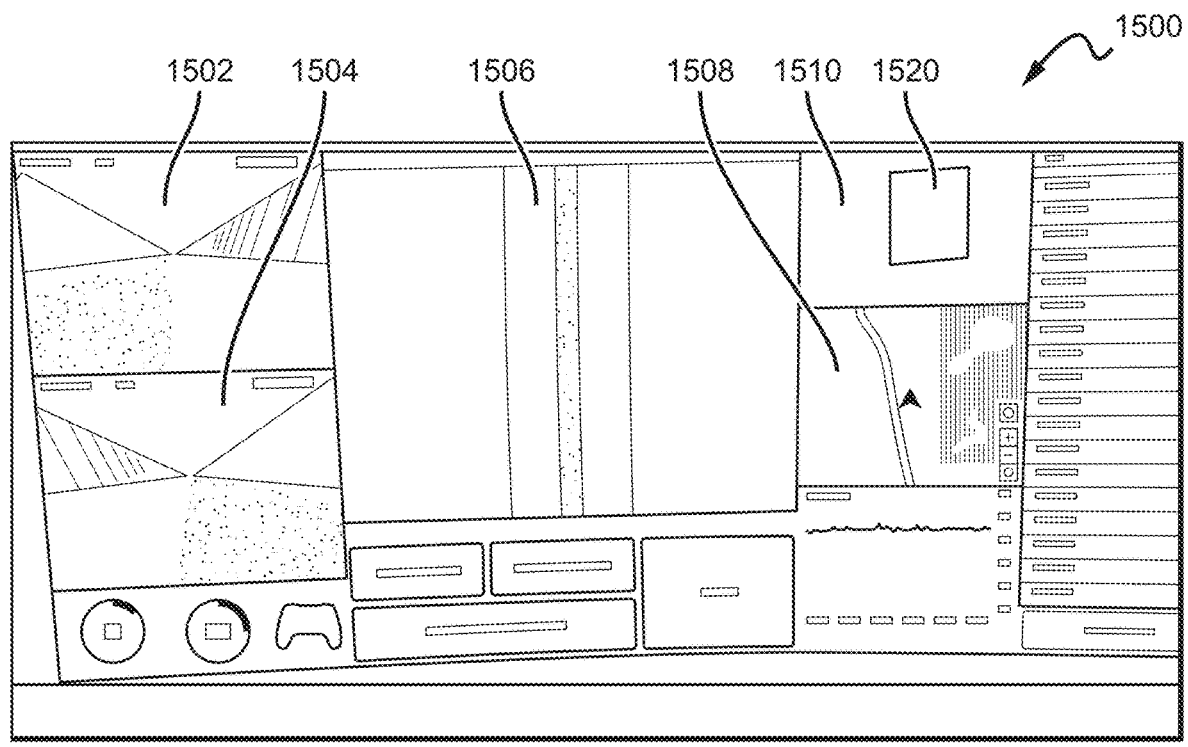
FIGS. 15A and 15B show user interfaces according to the present disclosure.
Figure 15B:
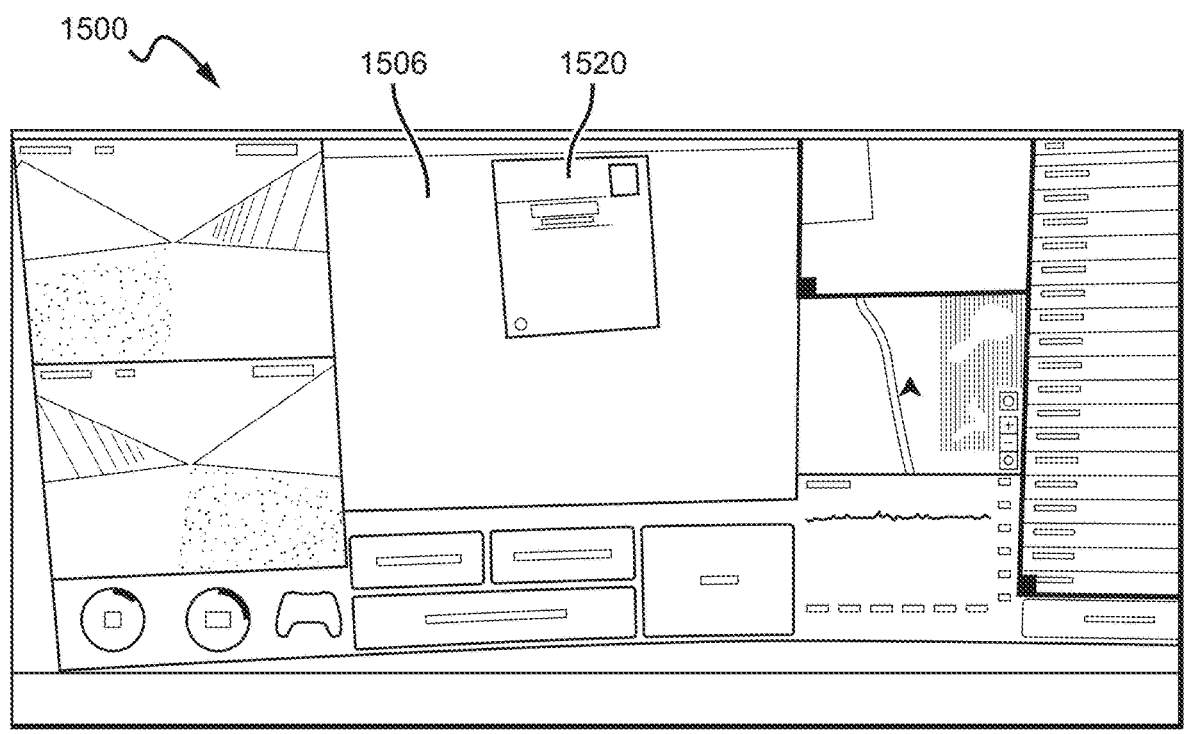

First, a user can log into a program for controlling and receiving feedback from the machine 200, which can have a user interface similar to or the same as that of FIGS. 15A and 15B (discussed below). The user sees video from one or more teleoperation cameras (e.g., forward-facing and rear-facing) (also referred to herein as navigation cameras), which provides the user with the necessary vision for moving the machine 200. The user may also see the location of the machine 200, such as using the GPS system, and the machine location can be overlaid on a map of the solar site. Obstacles may also be included on the map.

A system check can be performed, either automatically or by the user. For instance, system check items can include battery charge, connectivity strength (e.g. internet connectivity), and visual inspection of the machine 200, such as using a separate camera (e.g., a separate camera located at a charging location, or a camera of another machine 200).

Figure 6:
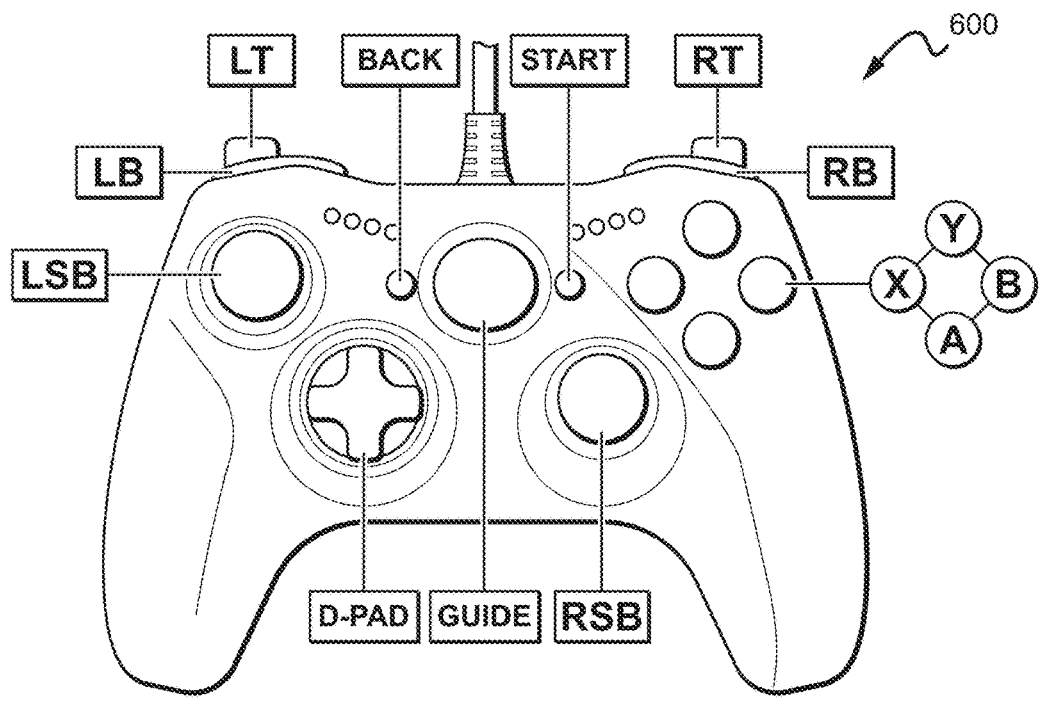
FIG. 6 is a schematic of a prior art controller that can be used to operate machines according to the present disclosure.

The user can operate the machine 200 using any number of devices and methods, with one such device being the controller 600 shown in FIG. 6, which in this specific instance is an X-Box controller. Any number of different types of controllers could be used, including a laptop, mobile phone, computer with mouse, gaming controller, etc., as would be understood by one of skill in the art.

Taking into account the past inspection activity, which can be provided to the user as described above with regard to FIG. 5, a first inspection target can be chosen, and the user can teleoperate/navigate the machine 200 to that location if it is not already there. The machine 200 can be driven (e.g., direction and speed) using the controller 600, and can use a compass and/or GPS for locating on a map. A location target can be, for instance, a row of solar panels. The user can teleoperate down a lane. One or more distance sensors can ensure that the machine 200 does not come too close to the solar panel rows on either side. In one embodiment, if the machine 200 comes too close to an obstacle, the controller 600 will vibrate; in another embodiment, if the machine 200 comes too close to an obstacle, it will automatically be stopped; and combinations of these methods are possible (e.g. vibration at one range, and stoppage at a closer range).

As the machine is teleoperated/navigated down the lane, the user can use the controller 600 to control the inspection camera (s) and/or thermal camera (s) 202, 206. The cameras can be coordinated so as to focus on the same target, and/or can be operated independently. As the user teleoperates down the lane, the cameras can be inspecting the panels on one side of the lane, which will be the topside or the underside of the panels. After getting to the end of the lane, the machine 200 can be turned around such as using the controller 600, or in another embodiment can include a reverse functionality. As the machine 200 goes back down the lane, the panels on the other side of the lane can be inspected, which will be the other of the topside and underside of the panels. In another embodiment, the machine 200 includes multiple of each type of camera so that it can inspect both sides of the lane at once, and thus not need to go down the lane twice, or can include cameras/imagers that are wide-view, such as 360°. In one embodiment, the machine 200 can be set to drive in a straight line at a set speed so that the user can focus on inspection. The use of one or more teleoperation cameras in addition to the inspection camera (s) is beneficial in that it can allow the user to see where the machine 200 is driving while also seeing the inspection target.

The cameras can also be operated using the controller 600. If a problem area is located, the user can zoom in on the problem area and take a snapshot from the inspection camera (s) 202 and/or the thermal camera (s) 206. A snapshot can be taken while the machine 200 is moving, or the machine 200 can be slowed or even halted beforehand. When a snapshot is taken, relevant metadata can be embedded, such as module GPS location estimate, time, date, temperature, location of target, etc., as would be understood by one of skill in the art. The user can then return to normal zoom, and continue to drive down the lane. An indication can be given to the user whenever the end of a lane is achieved, such as through vibration of the controller 600 and/or stopping the machine 200.

After inspection of the rows on either side of a lane is completed, the machine 200 can be driven to the next lane over, and can be re-centered to travel down and back that lane, continuing the process.

A user can receive an alert when the machine 200 is low on power/battery (e.g. when it reaches 50% charge, or 25% charge, etc.). The timing of this alert can take into account battery level and distance from a charge station (such as the nearest charge station). When the charge is low, the user can teleoperate the machine 200 to a charging station. The system can mark the location where the inspection left off, which can be used to continue inspection at a later time. During charging, the camera (s) can be located in a direction most useful for security reasons, such as towards a fence or gate. Activity while the machine 200 is being charged can be recorded for later review.

It should be understood that the manual operation described above could also be automated, with some examples of automation further described below.

Lower Power/Recharging Mode

The amount of charge remaining in the machine 200 can be monitored manually or automatically. Upon reaching a certain threshold low charge, the machine 200, either manually or autonomously/semi-autonomously as will be described below, can take one or more of a number of actions, such as 1) rerouting to the nearest charging station and/or 2) moving (e.g. forward, backward, rotationally, etc.) such that the machine's solar devices 210 encounter the sun and thus begin to restore the machine's charge. The location of the sun can be sensed using the machine 200, can be stored based on, e.g., date and time location, or can be provided manually, among other options that would be understood by one of skill in the art.

Autonomous/Semi-Autonomous Operation

As solar sites grow in size, such as modern day examples spanning hundreds of acres and over 100,000 solar modules, the need for autonomous or semi-autonomous operation of machines such as the robot 200 grows. Machines and methods according to the present disclosure can use one or more distance sensors, such as LiDAR sensors and/or AI range finders, for edge following and/or obstacle detection. A basic reactive control algorithm can be used as an edge following algorithm and can utilize data from one or more sensors.

Figure 7A:
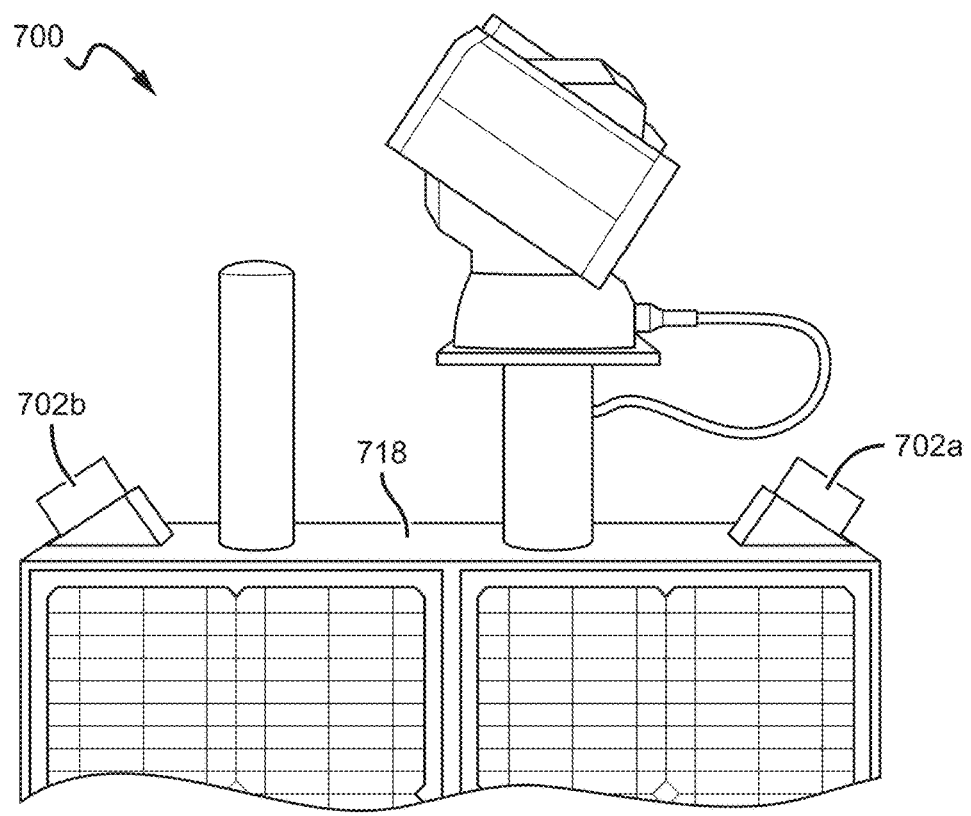
FIGS. 7A and 7B show another embodiment of a machine according to the present disclosure.
Figure 7B:
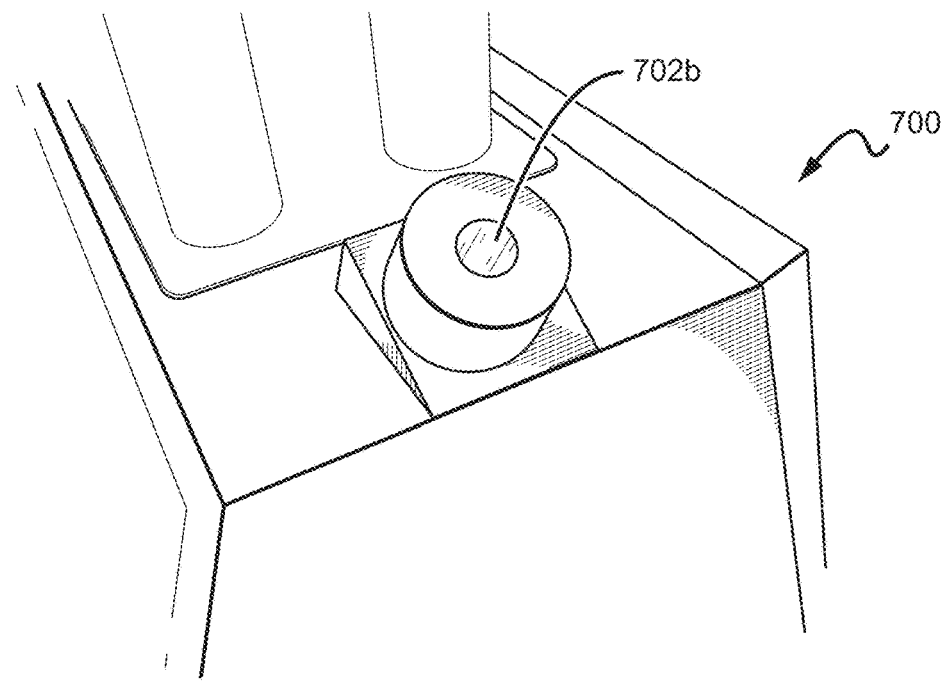

FIG. 7 shows one embodiment of a machine and/or robot 700 according to the present disclosure, including distance sensors (e.g., LiDAR sensors and/or AI range finders) 702a, 702b. The robot 700 can otherwise be similar to or the same as other robots described herein, such as the robot 200. In the specific embodiment shown, one distance sensor 702a is front-looking and mounted at the front of the robot 700, whereas the other distance sensor 702b is rear-looking and mounted at the rear of the robot 700. The use of one front-looking sensor and one rear-looking sensor can enable operation of the robot 700 in both forward and reverse, though it is understood that in some embodiments a single sensor 702 could be used, which could be front-looking (e.g., if the robot 700 were to operate by completing 180 degree turns). It is understood that other sensor arrangements, such as one or more 360 degree sensors, could also be utilized.

The sensors 702 can be mounted relatively high on the robot 700, such as on top of and/or otherwise above the top of the body 718, and/or under the camera unit (s). The sensors 702 can in some instances sense from −90 degrees to 90 degrees measured from the horizon. The sensors 702 can be angled downward, such as an angle of −15 to −75 degrees below the horizon, or −30 to −60 degrees (i.e., 30 to 60 degrees below the horizon). This downward angling can enable the sensors 702 to capture solar panels along the sides of the robot 702, and also the ground in front of and behind the robot. The downward angling can also reduce the likelihood of the sensors giving false readings through gaps between solar panels. By angling the sensors to measure a cross section of the solar modules, it can be possible to identify the front or the back of the module, which can be valuable in classifying inspection data.

Block Inspection

Figure 8A:
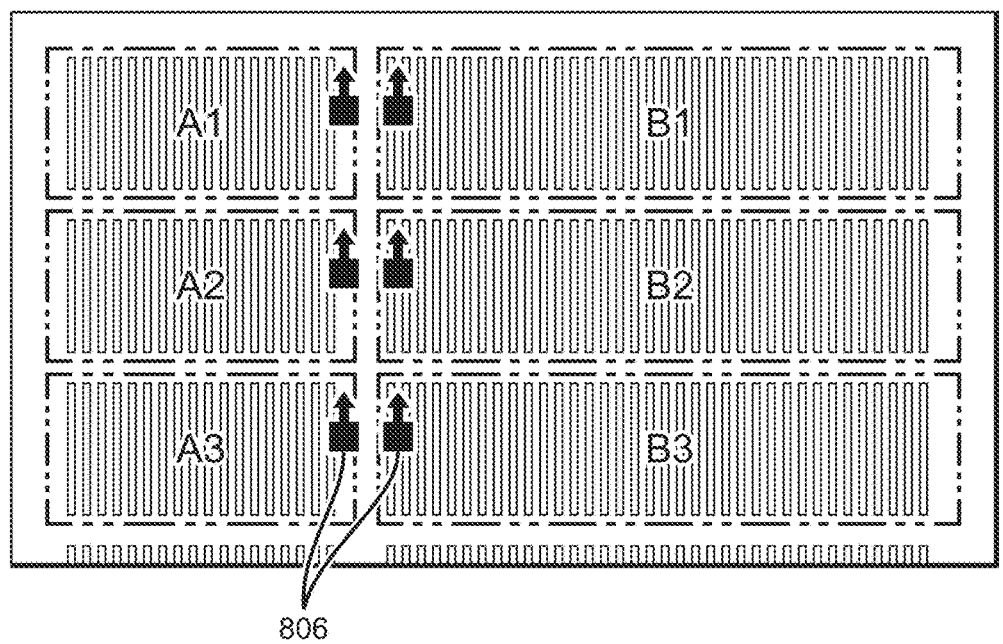
FIGS. 8A-8E show example solar site layouts and inspection pathways according to the present disclosure.
Figure 8B:
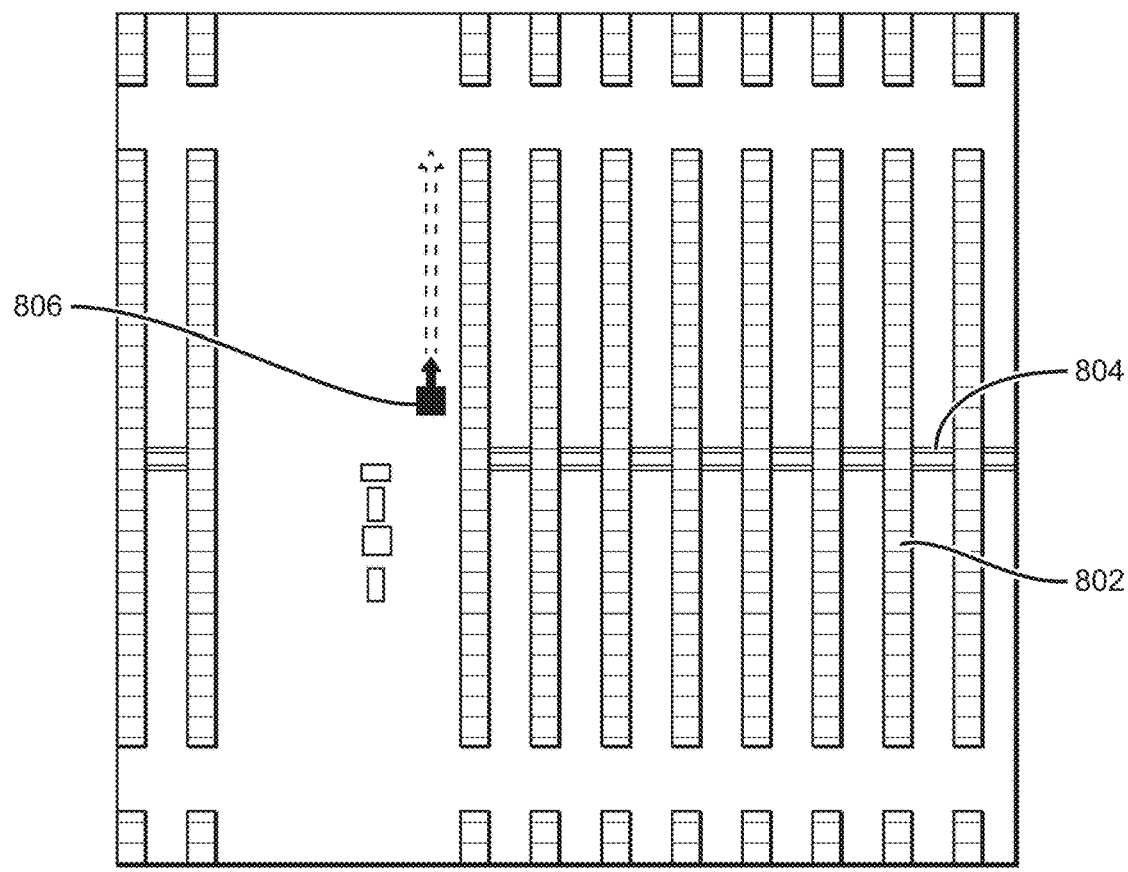
Figure 8C:
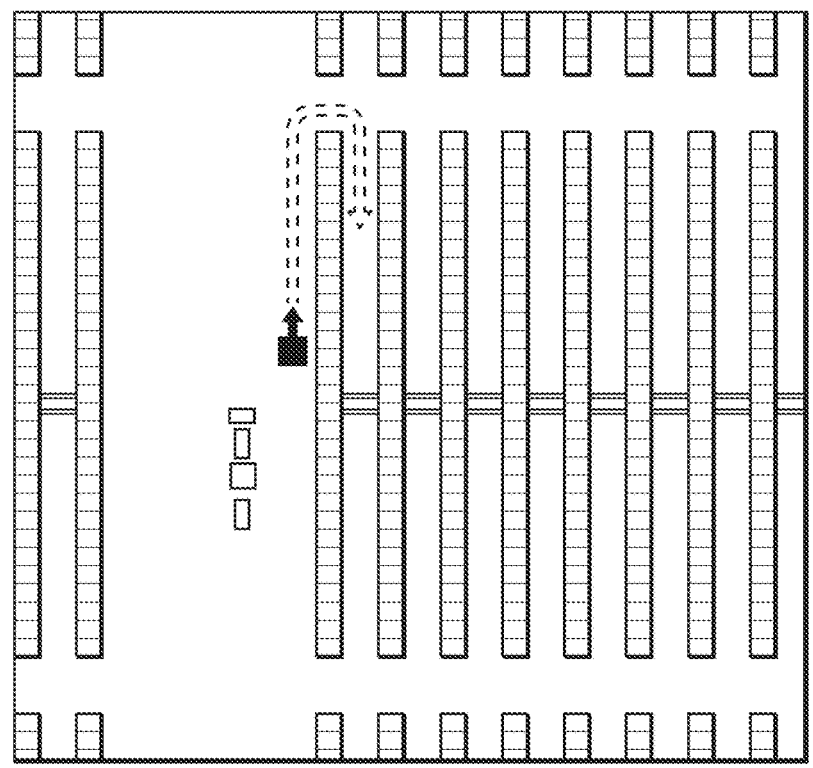
Figure 8D:
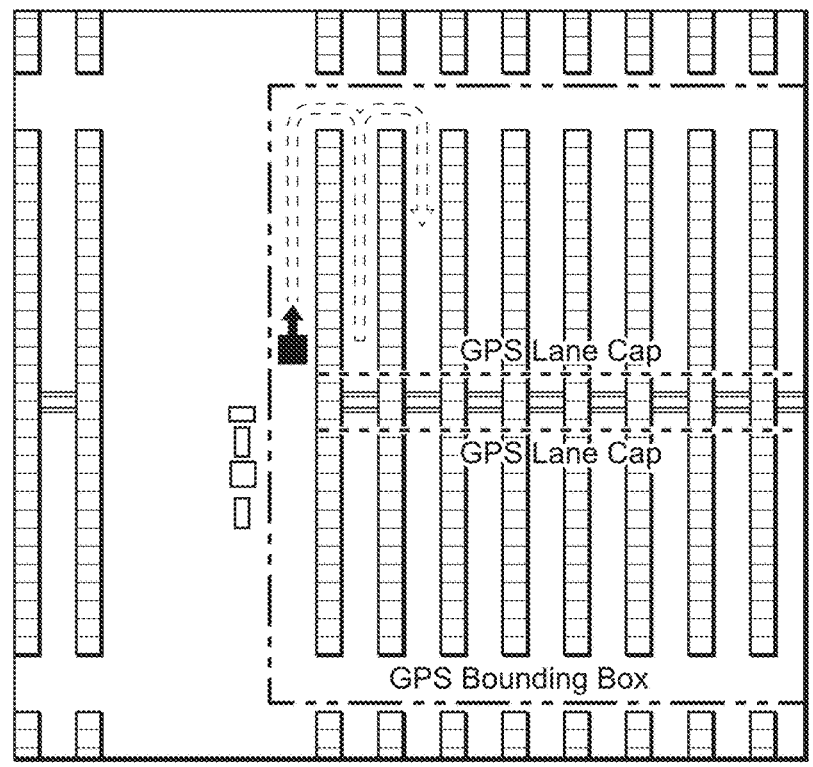

Inspection of a site can be accomplished on a block-by-block basis, such as the blocks A1-A3 and B1-B3 shown in FIG. 8A. FIGS. 8B-8E show a block 802 including a chase 804. The robot can follow point-to-point navigation to travel from a charging station to a starting point, such as the starting point 806. The starting point 806 can be pre-assigned, and can be, for example, the corner of the block, or the corner where a chase 804 meets an edge of the block 802. The starting point configuration can include, for instance, physical location (e.g. GPS location), an initial robot orientation, and/or an initial camera angle. The start configuration can be saved by manually driving the robot to the starting point 806 and saving the configuration, and associating it with the block 802. This manual drive step can be important for validating the suitability of the starting point 806, and often needs to be performed only once. It is understood that other manners of setting a start configuration are possible. FIGS. 8C and 8D then show chronologically a possible path for a machine according to the present disclosure to follow.

Figure 8E:
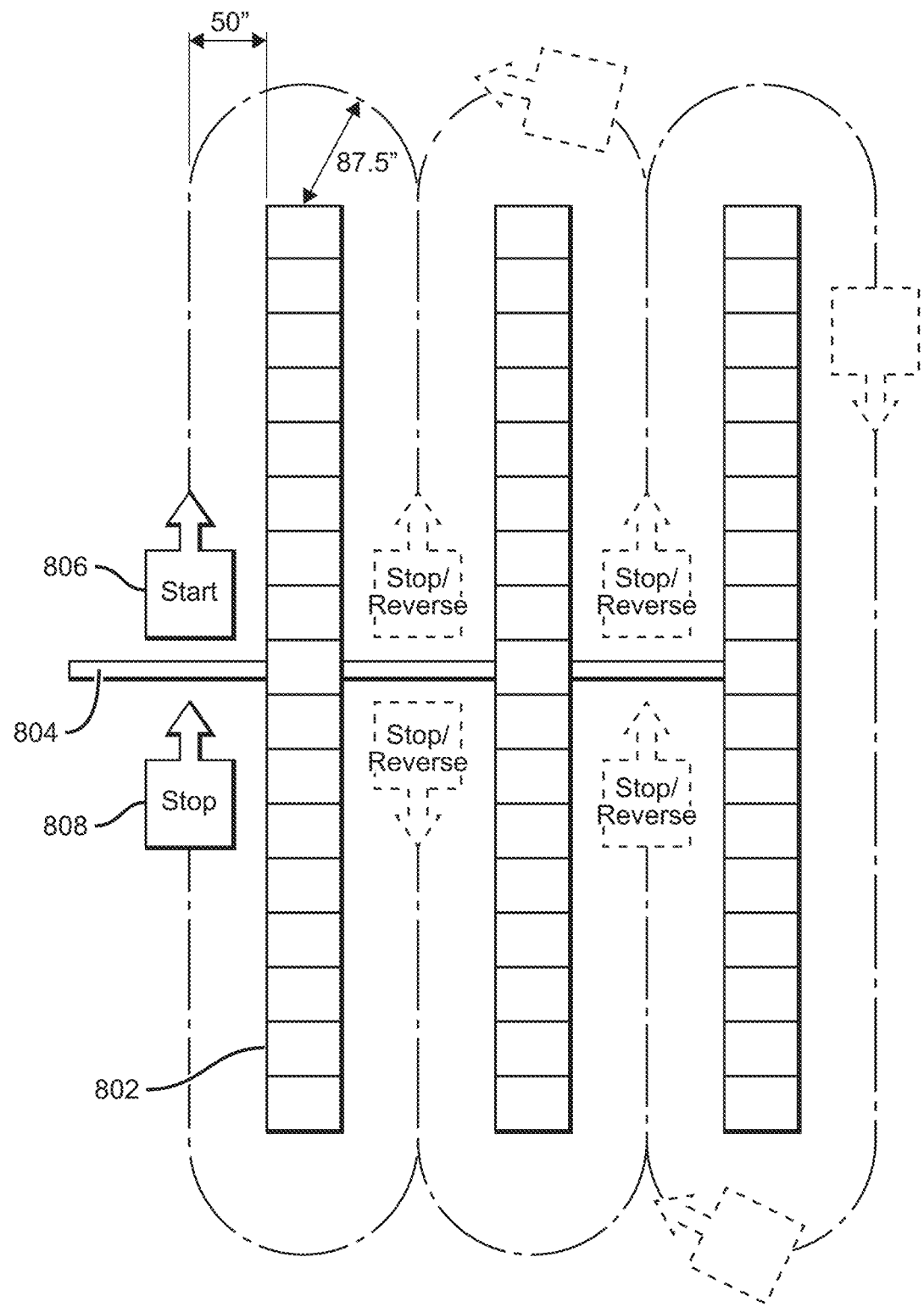

FIG. 8E shows one example of an inspection path for a block that machine according to the present disclosure can take. The robot can initially begin its inspection path along an edge or corner of the block 802 such as at the starting point 806, and then can inspect between rows until/unless it encounters a chase. Upon encountering a chase or another location such as the end of a row, lane, or array, the robot can reverse (or conduct a 180 degree turn) and navigate between the rows a second time while inspecting the row that was not inspected during the first trip. After traveling down each row, the robot can end at the ending point 808. The ending point 808 can also serve as a second starting point and the starting point 806 can also serve as a second ending point. Reversing instead of conducting a 180 degree turn can have multiple advantages. First, a 180 degree turn can require power that can otherwise be saved by reversing. Second, rotating in place to perform a 180 degree turn can in some instances cause site damage.

When navigating, the robot can recognize the end of a row and/or array using data from one or more sensors, such as the sensors 702. This can initiate a turn sequence. The turns can be completed using sensor data to keep the robot a safe distance away from the row and/or array. As shown in FIG. 8E, the machine can be configured to maintain a certain distance from obstacles such as the solar panels themselves, such as using the lane keeping methods described in the present application. In the specific case of FIG. 8E a distance of 50" is shown, but it is understood that other distances can be used, such as 6" to 120", 12" to 96", 24" to 72", or 36" to 60"; or 6" or greater, 12" or greater, 24" or greater, 36" or greater, 48" or greater, 60" or greater, 120" or less, 96" or less, 72" or less, 60" or less, or 48" or less; or combinations of these distances. Other distances and ranges are also possible. These distances could also be used during the turn sequence as shown, which in the specific embodiment of FIG. 8E shows a distance of 87.5". The distance while turning can be smaller, larger, or the same as the distance while navigating next to an array. In some embodiments, the distance is 1-3× any of the above distances or ranges, or 1.5-2.5× any of the above distances or ranges. Many different distances and ranges are possible.

It is understood that other methods of navigation are possible. By way of example only, GPS coordinates could be used for point-to-point navigation down each individual lane.

Geolocation Assistance

Machines according to the present disclosure, such as the machine 200, can be utilized to help accurately map a site location. Ground control points are known in the art of drone surveying, and are points with known coordinates that can then be used to accurately map large area using overhead images (e.g., from a drone). Typically, ground control points are placed using a marker of some sort, such as spray paint or smart GCPs such as those available from Propeller under its AeroPoints line. However, these prior art ground control points often require manual placement, which can be time consuming and expensive.

Figure 9:
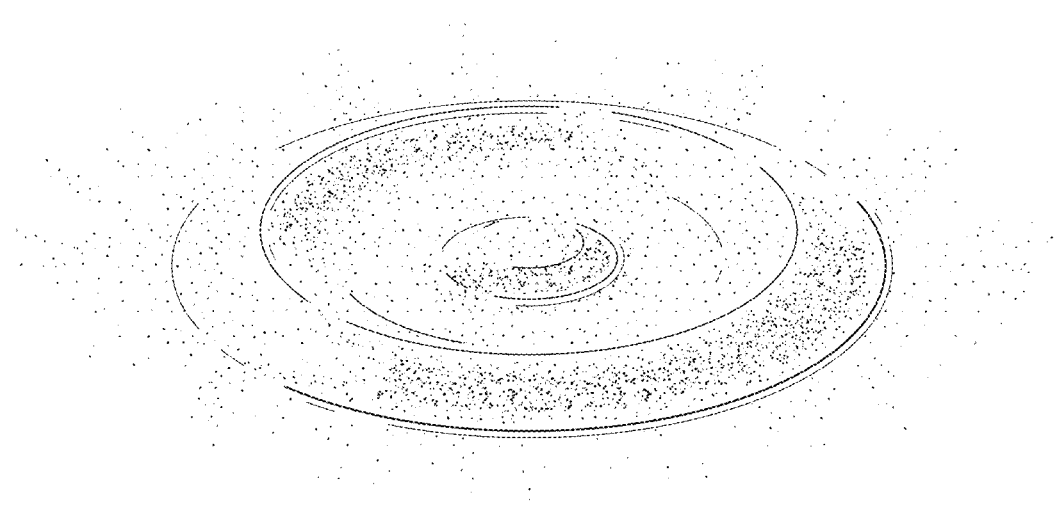
FIG. 9 shows marking of a photovoltaic site.

In an embodiment of the present disclosure, the machine 200 can be used to place ground control points. A plurality of points around a site can be chosen for placement of a ground control point. The machine 200 can then navigate to each such point and take that point's GPS coordinates (e.g., by staying still on the point for minutes as it captures a large amount of GPS data and averages that data to determine the final GPS coordinates). The machine 200 can then place a marker on that point, such as by spinning around to create a marker on the ground such as that shown in FIG. 9. It is understood that other marking techniques are possible as would be understood by one of skill in the art, such as by placing a physical marker such as spray paint or device. Overhead images of the site including a plurality of such markers can then be taken and an accurate site map formed utilizing the combination of the overhead images (and the markers' locations thereon) and the GPS data.

Inspection Boundaries

Figure 10:
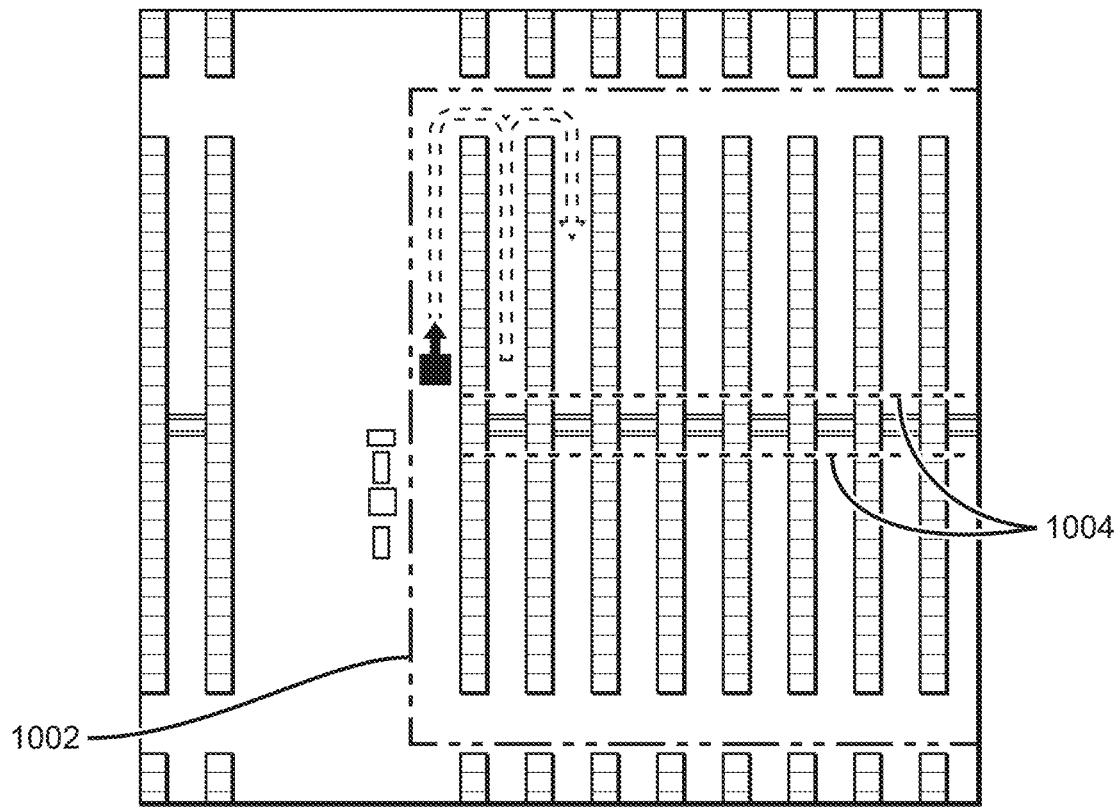
FIG. 10 shows another example of a solar site layout and inspection pathway according to the present disclosure.

FIG. 10 shows one example of inspection boundaries that can be used in embodiments of the present disclosure. In the present embodiment, the inspection boundaries include a bounding box 1002 and a lane cap 1004, though it is understood that other types of boundaries are possible, and that the bounding box 1002 need not necessarily be box-shaped. The bounding box 1002 can serve to keep the robot near to the inspection target (e.g., block), such as in case the robot loses its edge tracking. The lane caps 1004 can serve as a stop boundary, such as to prevent the robot from running into a chase in case of obstacle detection failure. These inspection boundaries can utilize GPS, and the robot's GPS tracker can sense when the robot encounters or crosses a boundary so as to stop the robot, though it is understood that non-GPS embodiments are also possible.

Lane Keeping

Figure 11:
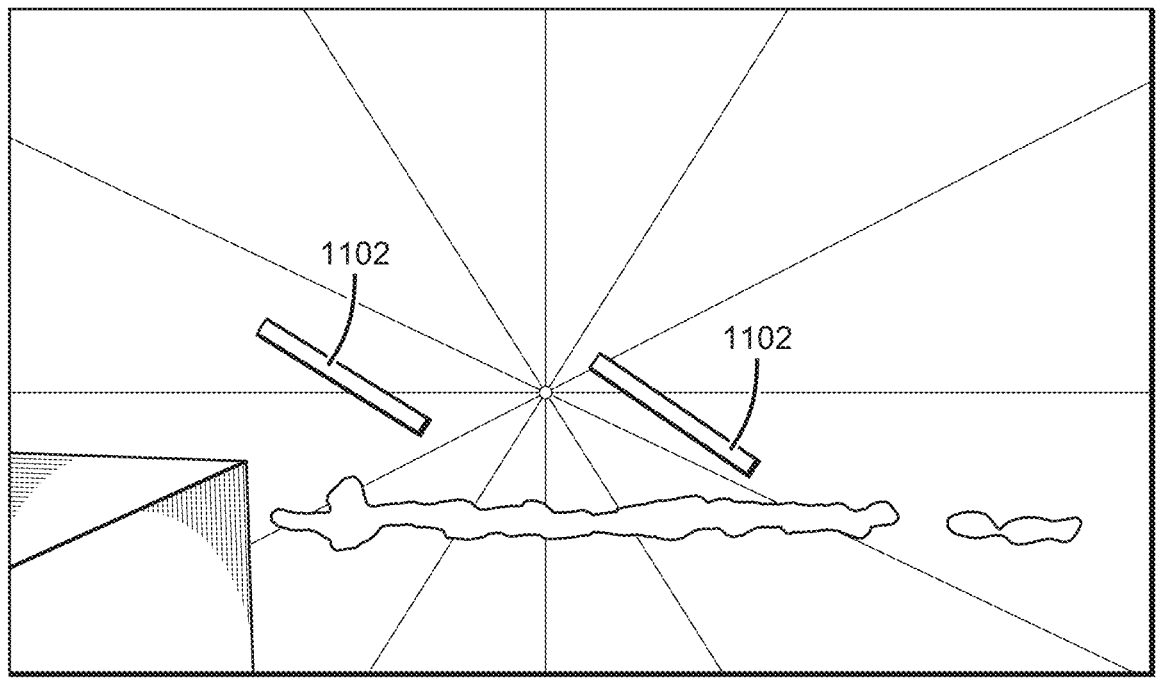
FIG. 11 shows an example sensor output from one embodiment of a machine according to the present disclosure.

In one embodiment, the robot will drive approximately down the center of a lane in order to keep it at a safe distance away from both arrays adjoining the lane. However, determining the center of a lane may not be straightforward, in that the positioning of the solar modules rotates throughout the day in order to maximize sunshine exposure. As such, instead of pre-setting a center line along which the robot will drive, the sensor (s) can be utilized to determine the approximate center of the lane when the robot is driving down the lane. For instance, FIG. 11 shows sensor output where the angle of the arrays 1102 can be seen. This information can then be used (e.g., along with a reactive control algorithm) to keep the robot approximately centered in the lane taking into account the panels' configurations at that time. Since arrays are often laid out all parallel with each other, it can be possible to use the onboard compass to simplify navigation by setting directionality while driving (e.g., once the robot is centered in the lane it can drive parallel to the solar arrays and make minor course corrections based on the measured gap on either side of the robot).

Obstacle and Terrain Detection

If an unexpected obstacle, such as a human or downed panel, appears in front of the robot, the robot can slow or stop so as to avoid collision. The robot can also notify an operator, who can take manual control. Obstacles can be detected with machine vision algorithms running on a navigation camera, an inspection camera, from 3D camera data, and/or from distance sensor data, to name a few. Similarly, if the robot runs over an unintended article or obstacle such as a large rock or hardhat, then the sensors (e.g., the gyroscope) will experience an unexpected event such as an unexpected robot angle, which can also result in the robot being stopped and/or notifying an operator. These same systems can also be used to detect collisions (e.g., the accelerometer can detect unexpected events like impulses caused by the collision). Multiple different types of sensors can be used and contribute to the determination of whether a failure mode has been entered into, in order to improve the safe operation of the robot. Once any of the above events is detected, the robot can send a notification and/or log the event.

Using the same methods and devices used to determine the presence of obstacles, the robot can also track the site terrain. For instance, the robot can detect the grade of terrain, such as by using an accelerometer and/or GPS versus location and/or time. This data can be used to detect, for example, potential water runoff and/or washout.

Certain types of sensors such as AI range finders or similar devices can be used not only to sense obstacles or rough terrain, but also to identify what the obstacle is, such that the machine 200 can respond appropriately. For instance, such a sensor could identify an object as a bush which is safe to drive over, or a rock which is not safe to drive over. This is different than, for instance, a LiDAR sensor, where different types of obstacles could appear to be similar or identical. In addition, an AI range finder and/or the cameras of the machine 200 could be used to identify and avoid harming protected wildlife.

Inspection and Navigation Algorithm Coordination

One goal of methods according to the present disclosure can be to achieve high quality data and/or images from the various machine sensors and cameras while also completing the inspection in a reasonable period of time by having the machines/robots move at sufficient speed. Inspection and navigation algorithms and methods according to the present disclosure can proceed in a coordinated fashion to achieve this goal. For instance, in one embodiment, if an inspection algorithm recognizes that the data (e.g. images) it is reviewing are not of sufficient quality or clarity, then it can send a message to the navigation algorithm to slow the machine/robot down until the data/images are of sufficient quality. The machine/robot can speed up once the terrain again allows for the capture of clear images at higher speed. As yet another manner in which the algorithms can coordinate, the inspection algorithm can indicate to the navigation algorithm when the next module to be inspected is too far away, after which the navigation algorithm will cause the robot to move into a better position for inspection.

Module Identification and Inspection

Figure 12A:
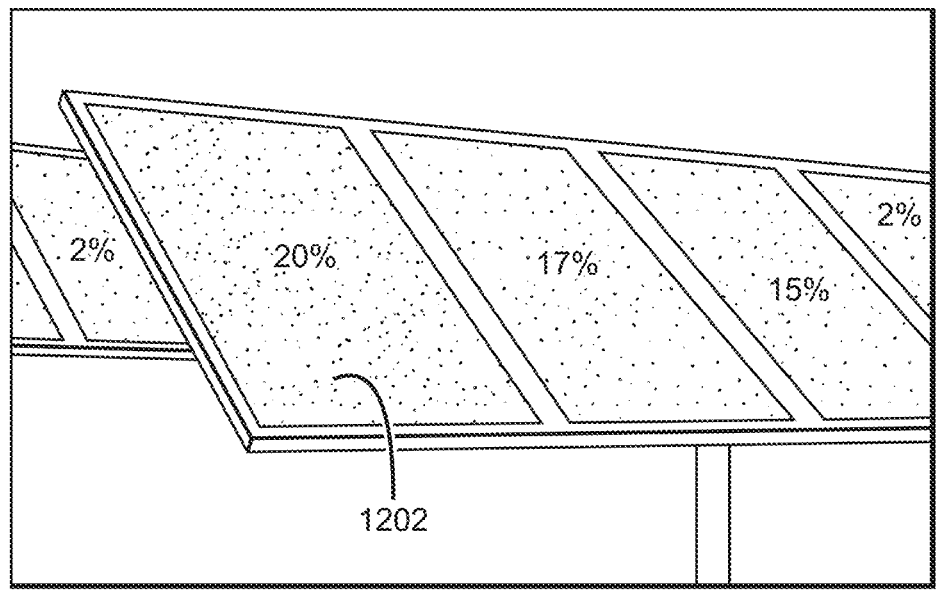
FIGS. 12A-12D show modules that are being inspected by one embodiment of a machine according to the present disclosure.

Each module that is being inspected can be assigned a unique identifier and location value (e.g., a GPS location value, and/or a location value achieved using the methods described above) (in some instances, the unique identifier is actually the estimated GPS value). The module closest to an inspection starting point (e.g., the starting point 806 from FIG. 8B) can be assigned a first unique identifier, and thereafter each successive module can be assigned an incremental identifier as it is inspected, such as in alphanumeric order, location order, inspection order, as-built identifier, etc. The first module can be recognized by the robot using one or more of its cameras or sensors. For instance, in one method as shown by FIG. 12A, the robot can identify which of the modules is taking up the most visual space (e.g. pixels on a screen) and thus can assume this module 1202 to be the first module. The robot can also tell whether it is inspecting the front or rear of the module based on the module angle, such as using a visual inspection algorithm or LiDAR data.

A module angle calculation can also be used to determine potential problems with a module, row, etc. For instance, if a row's sun tracker has malfunctioned, then the entire row may be angled incorrectly. This may be hard for a human to recognize given that all of the modules in the row may be angled in the same direction. However, the calculated angle can be compared to control data (e.g., historical or calculated data showing angle at a time of day on a certain date) to determine if a malfunction has occurred or is occurring.

Medium and large field of view thermal cameras/imagers can often be cost prohibitive. As such, the thermal cameras/imagers used in embodiments of the present disclosure can include pan and/or tilt capabilities. This can greatly reduce the criticality and precision needed from navigation, and allow for multiple different strategies for better framing solar modules for imaging.

Figure 12B:
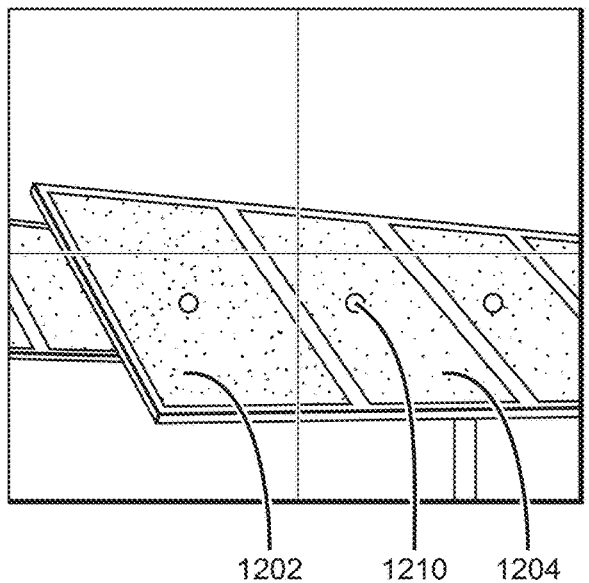
Figure 12C:
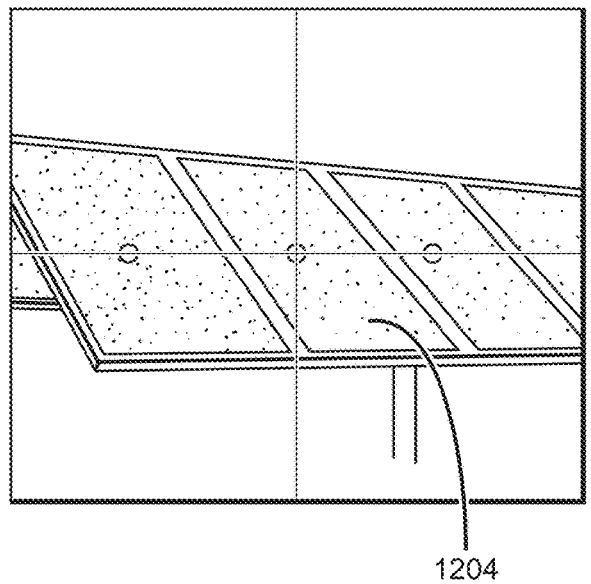
Figure 12D:
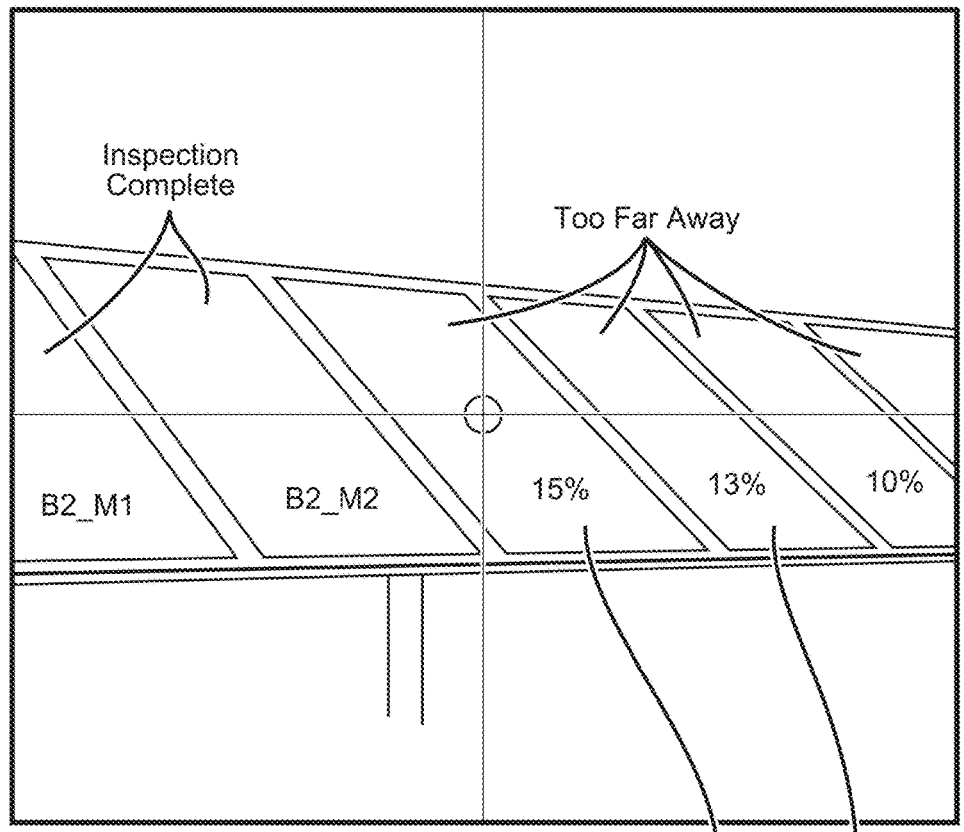

In one method of framing modules for imagine, the center 1210 of one or more target modules 1204 is identified, such as using a machine vision algorithm to identify pixels making up the module 1204, as shown in FIGS. 12B and 12C. The camera (s)/imager (s) can then pan/tilt from the position shown in FIG. 12B to the position in FIG. 12C to center approximately on the target module's center. After each module inspection is completed, the camera (s)/imager (s) can move on to the next sequential panel 1206 as shown in FIG. 12D. The inspection algorithm can then determine whether the target module is in range for an adequate inspection, or if it is too far away (e.g., the module 1206 and modules 1208) based on pixels vertically and horizontally consuming the image by the solar module surface. When the inspection algorithm concludes that the target module 1206 is too far away, it can direct/message the navigation algorithm to move the robot (e.g., drive it forward). While or after the robot has moved the camera (s) sensors can adjust (e.g., pan and/or tilt) to keep the target module centered in the frame. Once the target module 1206 reaches a target closeness or target size in the frame, photos/scans can be performed (e.g. a thermal photo and a color photo). These images can then be associated with the module's identifier in a database. If the robot moves such that the target module crosses a threshold of consuming too much of the vertical and/or horizontal components of the image, the inspection algorithm can direct the navigation algorithm to slow and/or stop and/or reverse, and/or can contact an operator for assistance.

Images can be autonomously reviewed to verify that they are sufficiently clear and/or otherwise of sufficient quality. This can be done in a number of ways, such as 1) using an imaging algorithm that runs as the images are taken, 2) taking bursts of multiple images (e.g. 2-10 images, or 5 images), and/or 3) using sensor data (e.g. from the accelerometer) to determine if there is an acceptable amount of vibration. Other methods, whether in place of or in addition to the above, are possible.

As described above, the robot can continue until it reaches the end of a row of modules. The end of a row can be identified by the navigation algorithm using location (e.g. GPS location), and/or driving a predefined distance measured by the robot motor encoders, and/or can be identified by the sensing algorithm by counting the number of modules imaged/sensed from the start of the row, which is often a constant number of modules in a row. The robot can then proceed as described above (e.g., reverse and take images of the row on the other side of the lane, maneuver to a new lane, etc.).

The above inspection methods can also be used for determine whether a panel was damaged within a certain time of its purchase, arrival, or installation. For instance, the purchase, arrival, and/or installation date for each panel can be logged and/or associated with that panel in a database. As the panels are inspected as described above, the inspection data can be compared to purchase/arrival/installation data to determine whether the panel has any issues within a certain time period. This can assist in determining whether a warranty claim could be made. In addition to those previously described defects, the robot can also inspect for, for example, torque marks, wire sag, the presence of a grounding wire, and incorrect installation, among other issues.

Failure Location Actions

Figure 13:
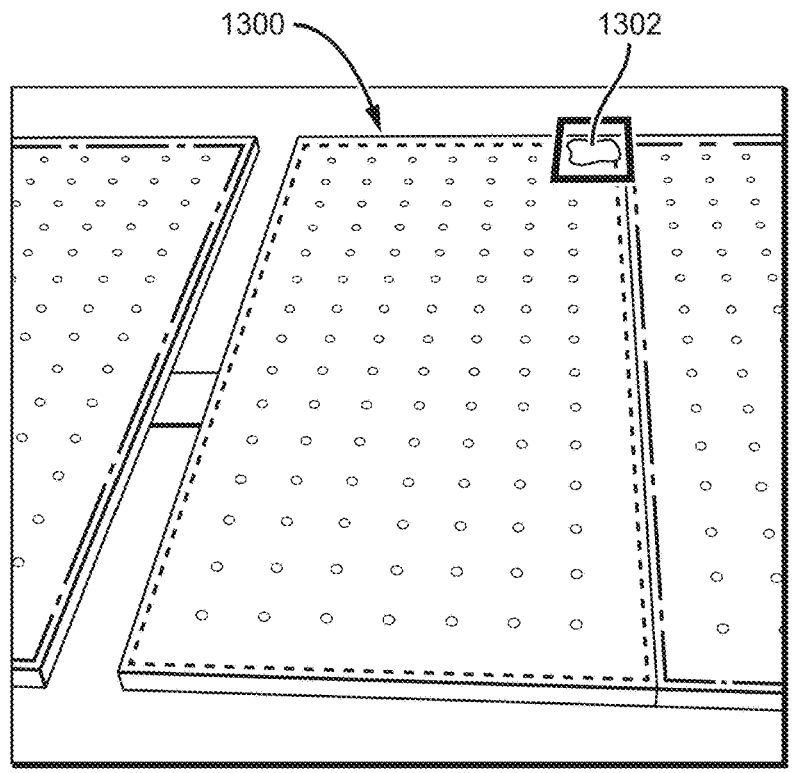
FIG. 13 shows a damaged module that is being inspected by one embodiment of a machine according to the present disclosure.
Figure 14:
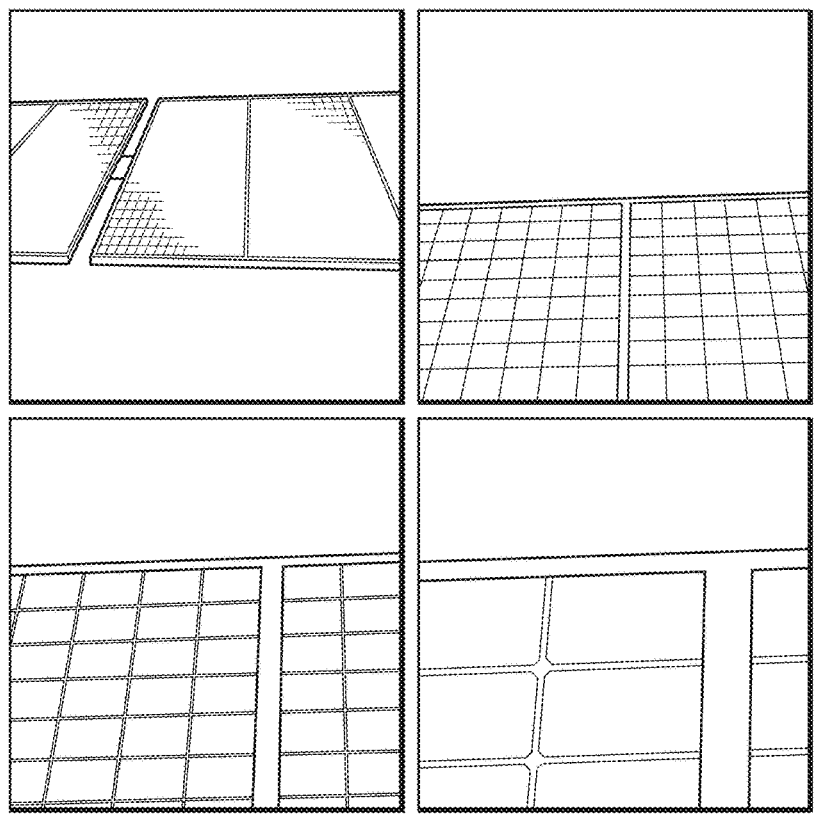
FIG. 14 shows various photographs of a damaged module taken by one embodiment of a machine according to the present disclosure.

FIG. 13 shows a thermal image of a module 1300 with a failure; in this case, a hot spot 1302 that is 10° C. hotter than the average temperature of the rest of the module. Upon recognizing a failure, the robot can stop so that further images can be taken from a stationary or in another embodiment, can slow so that further images can be taken from a less mobile position. An additional thermal and/or color image of the module can be taken after the robot has stopped/slowed. The camera(s)/imager(s) can then target the failure location in the center of the view and take a series of images, whether thermal and/or color, at varying factors of zoom (such as those shown in FIG. 14) to ensure that a high quality image that properly frames the issue is captured. These images can then all be associated with the module and the module's other information (e.g., unique identifier, GPS location, etc.).

Device Identification and Site Inventorying

After installation of panels 108 on the site 100, often various tasks must be accomplished before the site 100 can be connected to the grid, such as for insurance or regulatory purposes. One common requirement is that each solar device (e.g., module) be identified and/or geolocated. The module can also be associated with other information such as a serial number, a unique identifier (e.g., a visual identifier, such as a barcode (including a QR code and similar)), and identifiers for its various parts such as its combiner box. This can be helpful for, e.g., factory recall purposes.

Machines/robots, such as the machine 200, can be used for these identifying and inventorying tasks. Typically, each device (in this example, each module, though other embodiments are possible) will have an identifier 1520, which can comprise a barcode. The identifiers 1520 can be unique to their respective devices, and can be visual and/or scannable. FIGS. 15A and 15B show a user interface 1500 used in conjunction with a machine such as the machine 200. The interface 1500 includes images from a forward-facing camera 1502, a rearward-facing camera 1504, and an inspection camera 1506 (in this case a photographic camera such as a color photographic camera, and/or a pan/tilt/zoom camera, though other embodiments are possible). The interface 1500 also shows machine location tracking 1508, and a snapshot view 1510. The interface can also contain various other information and controls, such as speed and direction.

An algorithm can be used to locate the identifier 1520, e.g., by identifying shape and/or color of the identifier 1520. As the machine 1520 navigates the site, such as by navigating up a row, it can locate each identifier 1520, typically on the backside of a module, and image and/or take a snapshot 1510 of the identifier 1520. As it continues to navigate, the machine 200 will locate the next identifier (see area 1506 in FIG. 15B), and take a snapshot of that identifier 1520, which will eventually appear in the snapshot view 1510 (as shown in FIG. 15A) and be catalogued. The camera can look forward after it has taken a snapshot in order to try to locate the next identifier 1520. The camera can adjust using pan/tilt to keep each identifier 1520 in the frame (e.g. approximately in the center of the frame) while the snapshot is taken, and if a zoom camera is used it can zoom in and out as needed to obtain a clear snapshot. The camera can also take multiple successive snapshots in order to obtain a satisfactory snapshot for each module.

The speed of the machine 200 can be adjusted based on image quality. For instance, if the snapshots of an identifier are blurry as the machine 200 is passing, the machine 200 can slow down so that a better image can be taken, which may involve looking backwards to take the image. The machine 200 can also be sped up, such as if the camera is often looking ahead without having identified the next identifier 120, which can be a sign that the machine 200 is being operated slower than necessary. Speed adjustments can be manual or automatic as previously discussed. In one embodiment, the machine 200 can be operated in one direction (e.g. up a row) with the inspection camera pointing to one side (e.g. left) during a first part of the day (e.g. morning), and then be operated in the opposite direction (e.g. down a row) with the inspection camera pointing to the opposite side (e.g. right) during a second part of the day (e.g. evening). Because the panels will have adjusted to the location of the sun, this will allow the machine 200 to scan two different sets (e.g., rows) of modules.

As the images are taken, each module (or other-level device) can be counted and/or geolocated. Counting can help to verify module location and the completeness of the inspection, and/or can be catalogued as part of each module's associated data (e.g., "this is module 3 in row 5"). Geolocation can be achieved using the previously described devices and methods, for instance, by utilizing the location of the machine 200, the angle of its camera, and/or a distance sensor, or other techniques as known in the art. Each module's location can also become part of its associated data.

Fence Inspection

Similar strategies to the above can be used to inspect fences around solar sites. For instance, the robot can be used to find fence holes, damaged barbed wire, damaged fence poles, and environment (e.g. trees, brush, etc.) growing into the fence.

Vegetation Inspection

Similar strategies to the above can be used to inspect vegetation around solar sites. For instance, the robot can utilize a range finder, such as a 3D range finder, to determine the amount, extent, prevalence, and height of vegetation, which can both cause interference with the solar modules and pose a hazard (e.g. fire hazard).

Dead Zone Avoidance

As previously described the machine and/or robot can in some embodiments take instruction via a wireless signal such as a cell signal, 5G signal, WiFi signal, etc. The machine can change which of multiple signals it utilizes in order to maintain and/or maximize its connection. Moreover, a solar site can be monitored to determine the existence of signal dead zones, and the machine can avoid such dead zones manually, autonomously, or semi-autonomously as previously described. The presence of dead zones and/or avoided portions of inspection sites can be noted, and/or a notification can be sent to an operator. The machine can also track the strength of its connection versus location and/or time, and that data can be used to identify actual or potential dead zones.

Site Temperature Mapping

Machines according to the present disclosure can track the ambient temperature versus location and/or time. This data can then be used to generate a thermal map of a site, where different topography results in different temperatures and fluctuations. This data is valuable because ambient temperature affects solar panel efficiency.

Systems for Inspection/Monitoring of Structure-Mounted Panels

Figure 16:
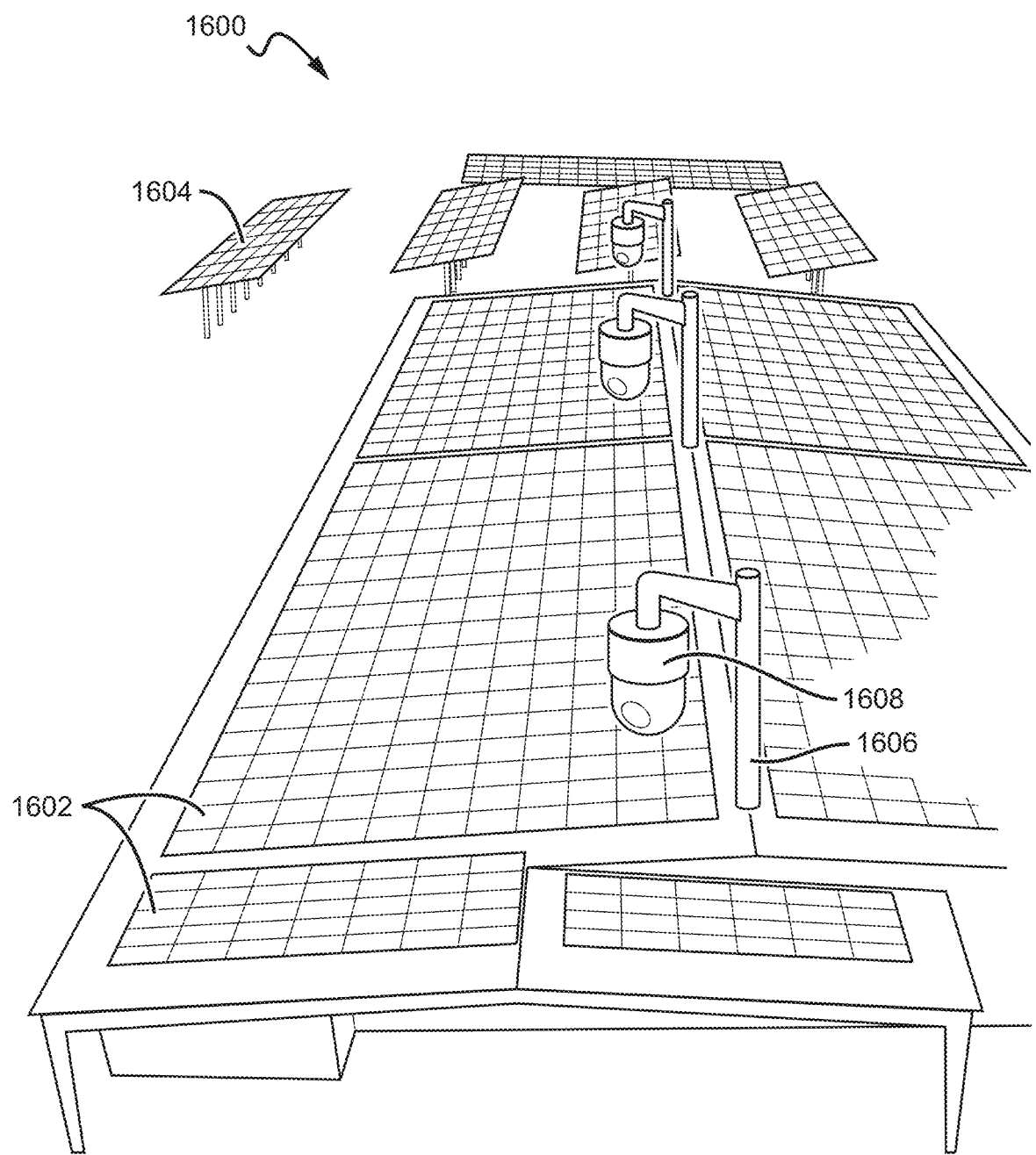
FIG. 16 shows a first embodiment of a monitoring system according to the present disclosure for structure-mounted solar panels.

Though they can also be used in other scenarios, the above machines and methods have generally been described with regard to ground-mounted solar sites/panels. In recent years, structure-mounted solar panels such as roof-mounted panels (collectively referred to hereinafter as "roof" or "roof-mounted," though it is understood that other types of structures and structure-mounted embodiments are possible) have become more common. FIG. 16 shows a roof-mounted solar site 1600 with roof-mounted solar arrays 1602, and parking cover mounted solar arrays 1604. Prior art machines and methods for inspection/monitoring of rooftop panels, such as drone inspection, can be difficult, inefficient, and expensive, due to, e.g., lack of easy accessibility for inspection. Additionally, rooftop solar inspection can be vital for the prevention of malfunctions that can cause catastrophic results, such as building fires.

Machines, devices, systems, and methods according to the present disclosure can be used for the monitoring and/or inspection of roof-mounted solar panels. These machines, devices, systems, and methods can be used to monitor performance and safety of these photovoltaic systems. FIG. 16 shows a system including one or more camera units 1608, which can include thermal and/or color cameras such as those previously described, which can be movably or statically attached to a mounting structure 1606 such as a pole. The pole can be on/attached to the structure, such as the rooftop, though it is understood that other embodiments are possible, such as where the mounting structure is on the ground or an adjacent structure. FIG. 16 shows three camera units 1608 each mounted on a respective mounting structure 1606, though it is understood that other embodiments are possible, such as where multiple camera units 1608 are mounted on a single mounting structure 1606.

The camera units 1608 can be similar to camera units previously described herein, such as the camera modules described above with regard to FIG. 2. The camera included in the camera units 1608 can be the same as or similar to the inspection camera 202 and/or thermal camera 206, though it is understood that other embodiments are possible.

The camera units 1608 can monitor for, for example, fire or overheating events that may cause damage to the solar site and/or the underlying structure. The previously described algorithms (e.g., machine vision algorithms) utilized to monitor ground-monitored solar sites can also be used to assess images from the camera units 1608 of roof-mounted solar sites. Visual fire detection ("VFD") algorithms and/or equipment can also be used to detect fire and/or smoke. Some VFD algorithms and equipment that can be used in embodiments of the present disclosure are those prior art algorithms and/or equipment available from, e.g., Teledyne Flir (often used in firefighting), ORR Protection (e.g., video image smoke detection and/or SigniFire) (often used in factories), and flame detectors and/or sensors available from Thomas (https://www.thomasnet.com). Many embodiments are possible. Some example sensors that can be used as part of camera units can include, for example, optical CAD cells, optical infrared sensors, optical ultraviolet sensors, and optical IR/UV combined detectors.

When a problem is identified, an operator can be notified, the problem can be logged, and/or other preventative steps may be taken. For instance, in one specific embodiment, if a problem is identified and/or assessed as being particularly dangerous, a shutdown of the solar operation or a portion thereof can be triggered and/or emergency alerts can be sent to the operators.

The camera units 1608 can be used to monitor all of the previously-described problems with solar panels, such as, but not limited to, hotspots, connector malfunctions, and inverter issues such as water intrusion (which is common due to the mounting on the roof) and inverter degradation/internal failure. Other types of monitoring are also possible.

Figure 17:
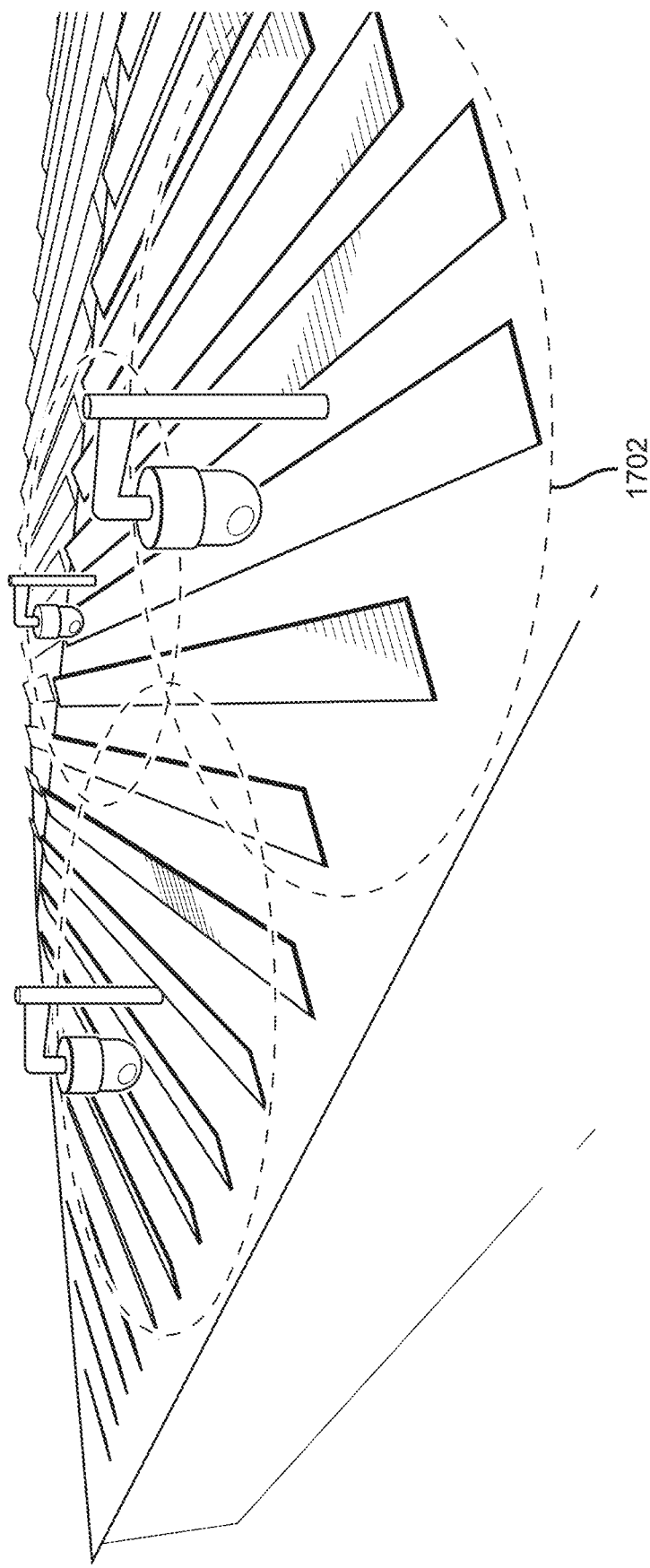
FIG. 17 shows a second embodiment of a monitoring system according to the present disclosure for structure-mounted solar panels.

Given that the inspection range of a camera unit 1608 is generally circular in nature, the camera units 1608 can be located so as to ensure all panels in the site/on the structure are covered by at least one camera unit 1608, as shown in FIG. 17 with two or more, three or more, or even more coverage zones 1702 that can overlap with at least one other coverage zone, more than one other coverage zone, two coverage zones, multiple coverage zones, or all coverage zones.

Additionally, the above-described systems, devices, and methods can be used and/or adapted for inspection and/or detection of systems other than structure-mounted photovoltaic systems. For instance, structure-mounted inspections can be directed at surrounding areas for wildfires or potential wildfire danger, and/or to inspect power lines and their componentry, such as their high temperature components, due to the inclusion of the various cameras that can also be utilized for photovoltaics. As another use, the above-described devices (e.g. a camera unit 1608) can be mounted on a vehicle to perform mobile inspections. In one embodiment, such a device (s) can be mounted on a maintenance vehicle and can perform inspections during transport to/from a maintenance site and when maintenance is being done.

The various exemplary inventive embodiments described herein are intended to be merely illustrative of the principles underlying the inventive concept. It is therefore contemplated that various modifications of the disclosed embodiments will without departing from the inventive spirit and scope be apparent to persons of ordinary skill in the art. They are not intended to limit the various exemplary inventive embodiments to any precise form described. Other variations and inventive embodiments are possible in light of the above teachings, and it is not intended that the inventive scope be limited by this specification, but rather by the claims following herein.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above. Moreover, it is contemplated that combinations of features, elements, and steps from the appended claims may be combined with one another as if the claims had been written in multiple dependent form and depended from all prior claims. Combination of the various devices, components, and steps described above and in the appended claims are within the scope of this disclosure. The foregoing is intended to cover all modifications and alternative constructions falling within the spirit and scope of the invention.

We claim:

1. A machine for inspection of photovoltaic systems, comprising:
    a body;
    one or more cameras attached to said body, said one or more cameras for inspecting a photovoltaic system; and
    one or more tracks, treads, or wheels attached to said body and configured to maneuver said machine over terrain;
    wherein said machine is configured to turn while maneuvering.

2. The machine of claim 1, wherein said one or more cameras comprises a forward facing navigation camera.

3. The machine of claim 1, further comprising a GPS system.

4. The machine of claim 1, further comprising one or more distance sensors for measuring the distance to said module.

5. The machine of claim 1, wherein said one or more cameras comprises an inspection camera and a thermal camera.

6. The machine of claim 1, wherein said one or more cameras are mounted on a rotatable head.

7. The machine of claim 1, wherein one or more of said cameras can pan, tilt, and zoom.

8. The machine of claim 1, wherein said machine is self-propelled.

9. The machine of claim 1, wherein said one or more tracks, treads, or wheels comprises one or more treads.

10. The machine of claim 1, further comprising a power source.

11. The machine of claim 1, wherein at least one of said one or more cameras is angled upward or configured to be angled upward.

12. A method of inspecting one or more solar modules, comprising:
    inspecting solar cells of a module visually and/or thermally from the frontside, and/or inspecting said module visually and/or thermally from the backside;
    electronically marking said module as inspected as of its time of inspection;
    using said marking, determining when said module is ready for re-inspection; and
    re-inspecting said module after it is ready for re-inspection.

13. The method of claim 12, comprising inspecting said solar cells of said module visually and thermally from the frontside, and inspecting said module visually and thermally from the backside.

14. The method of claim 12, wherein said method is performed by an autonomously driven machine.

15. The method of claim 12, further comprising moving said machine and inspecting a plurality of modules from a plurality of rows.

16. The method of claim 15, comprising navigating said machine through each of a plurality of lanes in a first direction to inspect one of the frontside or backside of the modules in a first adjacent row, and further comprising, for each respective lane, navigating said machine through said lane in a second direction opposite said first direction to inspect the other of the frontside or backside of the modules in a second adjacent row.

17. The method of claim 15, further comprising using one or more distance sensors to maintain a desired distance from said rows.

18. The method of claim 15, wherein said machine inspects said modules while moving.

19. The method of claim 15, wherein said machine is bound by one or more inspection boundaries.

20. The method of claim 15, comprising recognizing that a next successive module is too far away for inspection, and moving said machine closer to said next successive module at least until said next successive module is within an inspection range.

21. The method of claim 15, wherein inspection of each of said modules comprises taking one or more images of each of said modules and associating said one or more images with their respective module in a database.

22. The method of claim 15, further comprising identifying a defect in one or more of said modules, and performing an enhanced inspection of each of said modules identified as containing a defect.

23. The method of claim 12, comprising visually and/or thermally inspecting a connector on the backside of said module.

24. The method of claim 12, performed on a plurality of modules from different arrays in a site.

25. A method of inspecting one or more solar modules in a solar site, comprising:
    maneuvering an autonomously driven or semi-autonomously driven machine over terrain; and
    during said maneuvering, inspecting a plurality of solar modules visually and/or thermally from the backside.

26. The method of claim 25, comprising inspecting said plurality of solar modules visually and thermally from the backside.

27. The method of claim 25, wherein said plurality of solar modules comprises solar modules from different arrays in a site.

28. The method of claim 25, wherein said machine comprises one or more tracks, treads, or wheels for said maneuvering.

29. The method of claim 25, wherein said autonomously drive or semi-autonomously driven machine is directly on said terrain during said maneuvering.

* * * * *